(12) United States Patent
Levin et al.

(10) Patent No.: US 9,473,259 B2
(45) Date of Patent: Oct. 18, 2016

(54) TECHNIQUES FOR TESTING RECEIVER OPERATION

(71) Applicant: INTEL CORPORATION, Santa Clara, CA (US)

(72) Inventors: Itamar Levin, Holon (IL); Kevan A. Lillie, Chandler, AZ (US); Dima Hammed, Jerusalem (IL); Elior Segev, Mevo Horon (IL); Mingming Xu, Pheonix, AZ (US); Tomer Fael, Jerusalem (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/550,822

(22) Filed: Nov. 21, 2014

(65) Prior Publication Data

US 2016/0149656 A1   May 26, 2016

(51) Int. Cl.
*H04B 17/00* (2015.01)
*H04B 17/24* (2015.01)
*H04B 17/29* (2015.01)
*H04L 25/03* (2006.01)

(52) U.S. Cl.
CPC .............. *H04B 17/24* (2015.01); *H04B 17/29* (2015.01); *H04L 25/03057* (2013.01); *H04B 17/00* (2013.01)

(58) Field of Classification Search
CPC . H04B 17/29; H04B 17/00; H04L 25/03057; H04L 27/01; H04L 2025/0349; H03G 1/00
See application file for complete search history.

(56) References Cited

U.S. PATENT DOCUMENTS

2006/0188043 A1*  8/2006  Zerbe et al. .................. 375/346
2010/0238993 A1*  9/2010  Huang et al. ................. 375/233

* cited by examiner

*Primary Examiner* — Jean B Corrielus

(57) ABSTRACT

Various embodiments are generally directed to techniques for testing a receiver incorporated into an IC to receive a bitstream. An apparatus includes a precharge component to set a VGA to output a differential bias voltage; a taps component to set a tap to form a feedback loop that extends from an output of the bit slicer to the input of the bit slicer through a delay circuit and the tap, the tap to output a first differential voltage to the input of the bit slicer to invert a polarity of a sum of differential voltages at the input of the bit slicer to enable oscillation of the bit slicer, the sum generated from at least the differential bias voltage and the first differential voltage; and a capture component coupled to the output of the bit slicer to capture a series of bit values therefrom. Other embodiments are described and claimed.

25 Claims, 11 Drawing Sheets

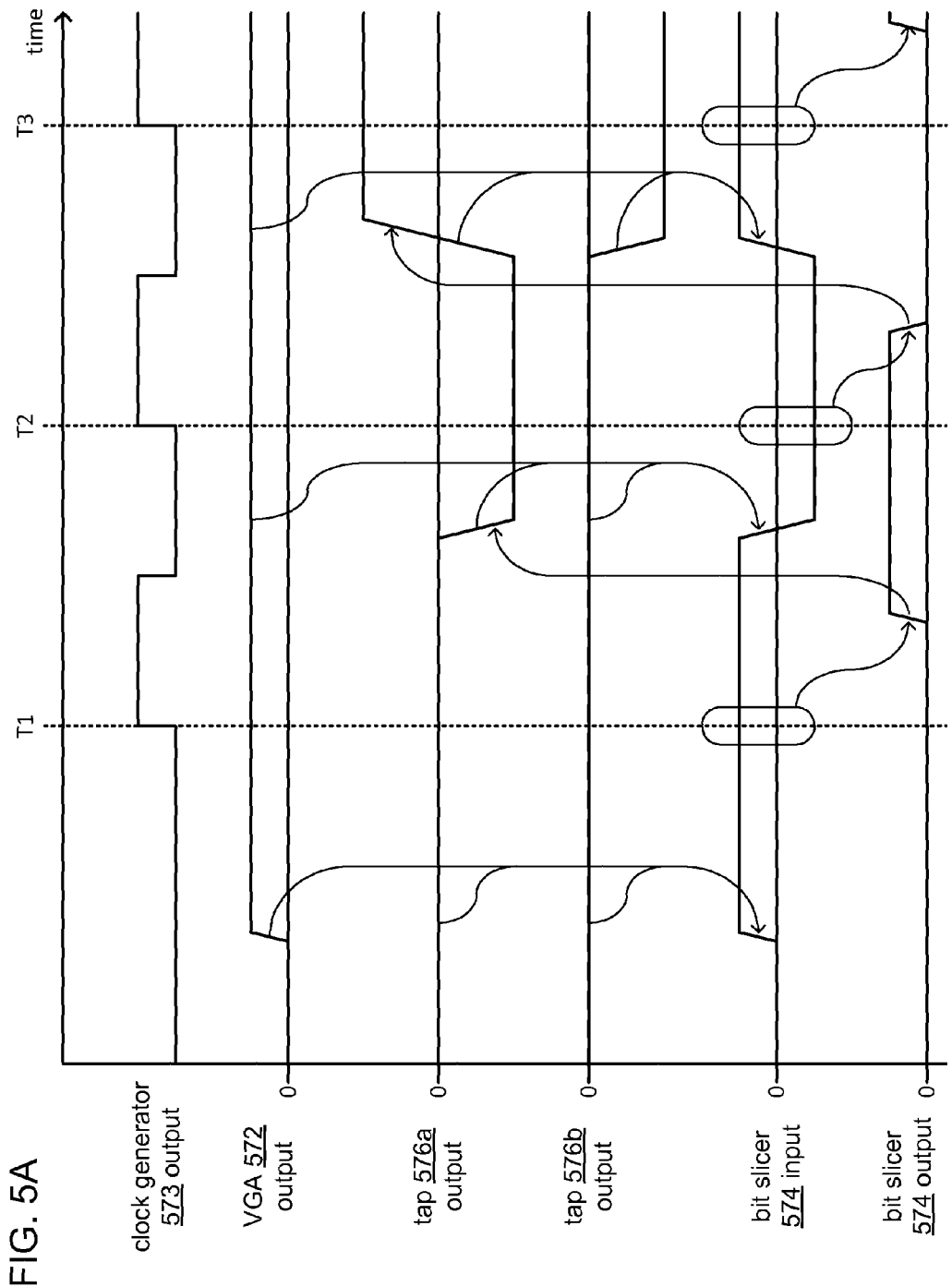

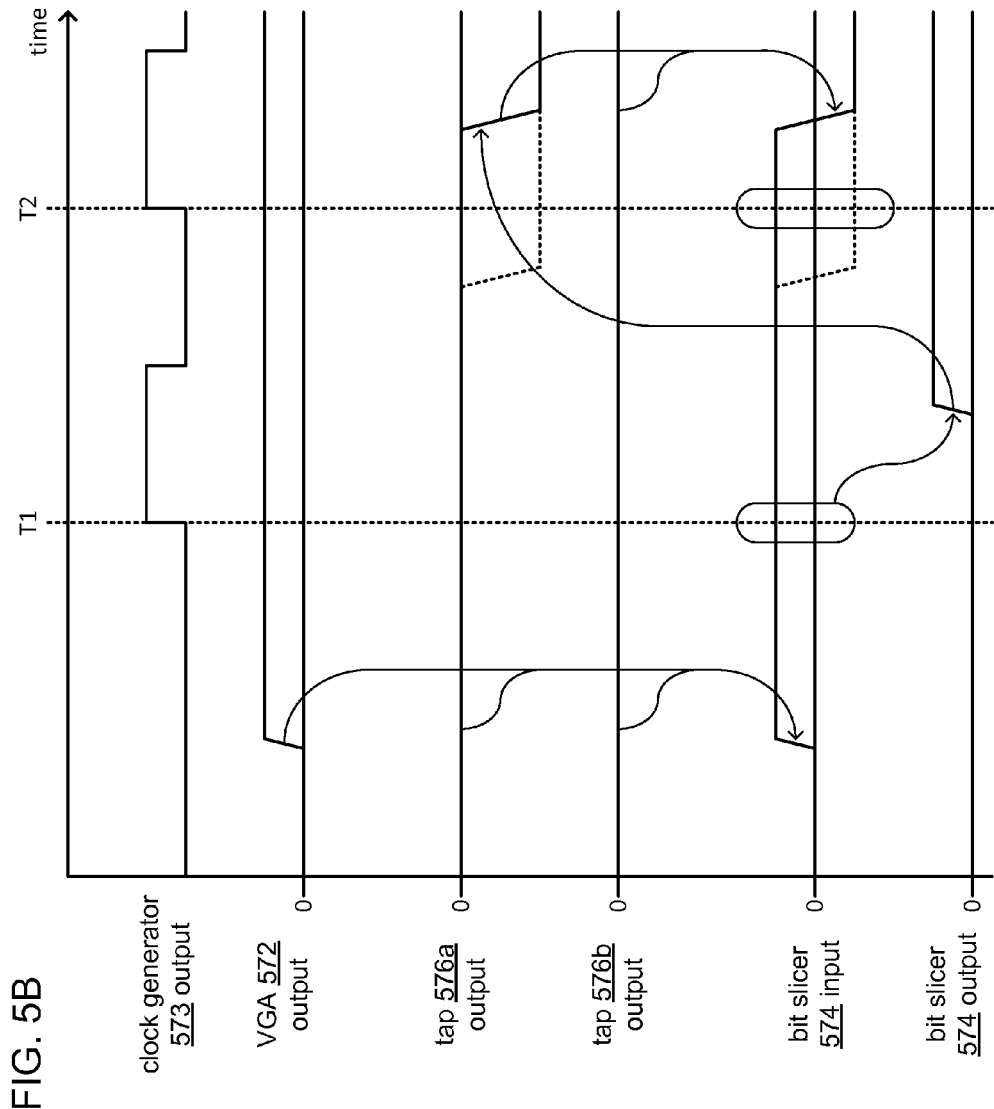

2200

TECHNIQUES FOR TESTING RECEIVER OPERATION

BACKGROUND

As transistors continue to be designed with ever smaller sub-micron dimensions that require increasingly complex semiconductor fabrication processes to produce, maintaining consistency in the production of those transistors becomes increasingly difficult. This is of particular concern with circuits in which those transistors are used to exchange signals between integrated circuits (ICs) with ever increasing data transmission rates. In particular, as high speed serial input/output (I/O) circuits now reach ever higher data transmission rates, the need for consistency in the production of the transistors used within those high speed serial I/O circuits increases, even as the ability to provide that consistency decreases.

A solution to ensuring such consistency in high speed serial I/O circuits is to test mass produced ICs to determine which ones include high speed serial (I/O) circuits that are able to be operated at the desired higher transmission rates without errors or at least with acceptably low error rates. ICs found to meet such requirements are then sorted out from the ones that do not, and are then used in applications that employ such high transmission rates. Unfortunately, both cost and technical issues have plagued the manner in which such tests have been performed.

Such testing usually entails the connection of expensive test equipment to one or more portions of a high speed serial I/O circuit to observe its behavior as it is tested. However, the shrinking sub-micron dimensions of transistors of these circuits and their operation at such high frequencies both conspire to increase susceptibility to electrical and/or electromagnetic influences that are unavoidably exerted on these circuits through the simple act of connecting such test equipment to them. Much of the expense of such test equipment arises from the effort to carefully design and fabricate components of such test equipment to minimize such influences exerted on such circuits as much as possible, but such influences cannot be completely eliminated. As a result, it is often not possible to rule out electrical and/or electromagnetic influences of such test equipment as the cause of at least a subset of instances in which a high speed I/O circuit fails during such testing. Indeed, the nodes connecting the transistors in such high speed serial I/O circuits must be made with such minimal sub-micron dimensions that adding a gate input of a transistor to such a node can greatly degrade or impeded its ability to convey signals between transistors quickly enough. As a result, even the addition of sub-micron transistors to monitor signal activity in lieu of using external test equipment can undesirably affect the operation of such high speed serial I/O circuits.

BRIEF DESCRIPTION OF THE DRAWINGS

FIGS. 5A and 5B illustrate example results of embodiment of testing a receiver.

DETAILED DESCRIPTION

Figure 1:
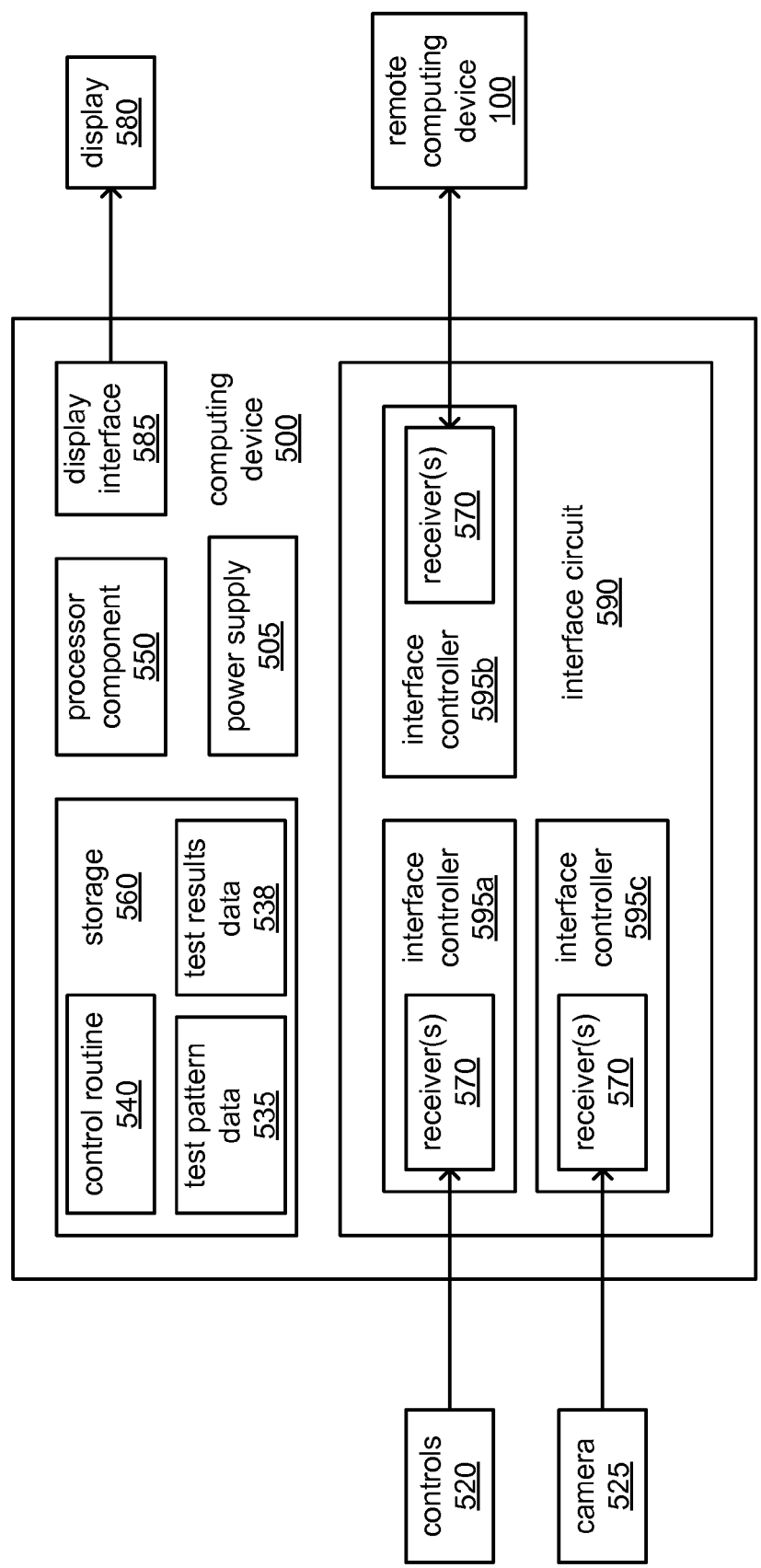
FIG. 1 illustrates an example embodiment of a computing device receiving data from other devices.

Various embodiments are generally directed to techniques for testing a receiver incorporated into an IC to receive a bitstream. A signal conditioning component (e.g., a termination block or front end equalizer) at the input of the receiver may disconnect the input of the receiver from signal activity at the input of the receiver to prevent such signal activity from influencing the test. A variable gain amplifier (VGA) or other component of the receiver (e.g., a converged component that performs both of the functions of signal conditioning and amplifying with a variable gain) of the receiver may generate a bias voltage at a summing node of a decision feedback equalizer (DFE) coupled to an input of a bit slicer of the receiver to precharge the input of the bit slicer prior to starting the test. A set of taps that receive an output of the bit slicer through a chain of delay circuits drive the summing node with voltage levels to form multiple parallel feedback loops. The chain of delay circuits store bit values of a quantity of bits most recently output by the bit slicer. The lack of external influence from signal activity at the input of the receiver and the provision of the feedback loops from the output of the bit slicer to the input of the bit slicer may cause at least the bit slicer to self oscillate. If the propagation delay through the components of the receiver that form the multiple parallel feedback loops is low enough, then the self oscillation may occur at the frequency generated by a clock generator that drives the bit slicer and the chain of delay circuits such that the output of the bit slicer transitions between high and low output states at the frequency of the clock generator.

The signal received by the receiver during normal use of the receiver may be a bitstream in which high and low voltage levels latched at a recurring interval of time and/or the presence or absence of a transition between high and low voltages during each interval of time conveys a bit value. The signal may be a differential signal conveyed to the receiver by a pair of conductors that provide opposing current flows that form a loop of current flow at the input of the receiver. More specifically, each high voltage level on one of the two conductors is paired with a low voltage level on the other of the two conductors to form the loop of current flow, and each transition between high and low voltages is conveyed as opposing transitions on the two conductors such that the direction of current flow in the loop is reversed with each such transition.

The bitstream conveyed by the signal received by the receiver may convey bits of any of a variety of types of data, and the receiver may be incorporated into any of a variety of types of electrical interface employed for any of a variety of types of data transmission. Thus, the receiver may be incorporated into a wired network interface to enable receipt of any of a variety of types of data at a computing device through a wired network to which that computing device is coupled. Alternatively, the receiver may be incorporated into a storage device interface to enable the receipt of any of a variety of types of data retrieved from a storage device such as a hard drive, a solid state storage device, etc. As another alternative, the receiver may be incorporated into a peripheral device interface to enable the receipt of any of a variety of types of data at a computing device from any of a variety of peripherals such as a video camera transmitting a bitstream of video data, a scanner transmitting a bitstream of data representing scanned document pages, an audio source device transmitting a bitstream of data representing multichannel audio at a high sampling rate, etc.

The signal conditioning component may be any of a variety of types of component that acts to improve one or more characteristics of the signal conveying the bitstream, and may serve as the component of the receiver that directly receives that signal. The signal conditioning component may be a relatively simple termination block or may be a relatively sophisticated front end equalizer that may employ any of a variety of types of equalizer circuit, including and not limited to, a feed-forward equalizer (FFE), a continuous time linear equalizer (CTLE), etc. As familiar to those skilled in the art, resistance, capacitance and/or inductance characteristics of conductors employed in conveying a signal to a receiver may attenuate different frequency components of the signal to different degrees. Of significance to conveying bitstreams at high data transfer rates is that such attenuation can act in a manner akin to a low-pass filter such that important higher frequency components may be harder to detect among the lower frequency components. To counter this, a front end equalizer (or other form of signal conditioning component) may be used that implements at least some degree of high pass filtering to equalize the relative strengths of lower and higher frequency components. In embodiments in which a front end equalizer is used, it may be configured differently in preparation for testing. Specifically, it may be configured to reduce the amplitudes of all frequency components of any signal activity occurring at the input of the receiver to an extent that effectively disconnects the input of the receiver from that signal activity.

The input of the VGA may be directly coupled to the output of the signal conditioning component to receive the signal that was received by the receiver following equalization and/or other conditioning of the received signal performed by the signal conditioning component. With the signal conditioning component configured to effectively disconnect the receiver from signal activity occurring at the input of the receiver in preparation for testing, the output of the signal conditioning component to the input of the VGA may be a steady differential voltage. The output of the VGA may be directly connected to the input of the bit slicer through a pair of conductors serving as a summing node to convey a summed differential signal that includes the output of the VGA to the input of the bit slicer. It should be noted, however, that an active summing node (e.g., use of capacitor charging with switching integrator) may be used in place of such a passive form of summing node in some embodiments. In some embodiments, the VGA may be configured to drive a differential bias voltage to the summing node to convey to the input of the bit slicer by employing a gain setting selected to manipulate a steady differential voltage output by the signal conditioning component to generate the differential bias voltage. In other embodiments, the VGA may be capable of providing a differential bias voltage level with a programmable voltage level at its output in addition to providing a programmable gain such that the VGA may be configured to itself provide the differential bias voltage on the conductors of the summing node.

The outputs of the taps may be coupled to the summing node to be thereby summed with the output of the VGA and the resulting sum may be provided to the input of the bit slicer. In embodiments in which the summing node is a passive summing node implemented with a pair of conductors coupled directly to the input of the bit slicer, the outputs of the taps may each be directly coupled to that pair of conductors to be thereby summed with the output of the VGA and that the sum of those outputs may be directly provided to the input of the bit slicer. Thus, the bias voltage output by the VGA may be selected to both place the bit slicer in a known state at the start of the test and to be of a magnitude low enough to still be overcome by each of the outputs of the taps in the summing of voltages that occur on the conductors of the summing node. The inputs of the taps may be coupled to the output of the bit slicer through a chain of delay circuits that latch and hold a quantity of bit values most recently output by the bit slicer for use as inputs to the taps. More precisely, in the chain of delay circuits, the output of one delay circuit is coupled to the input of another, and the output of each of the delay circuits may be coupled to the input of one of the taps such that there may be a one-to-one correspondence of delay circuits to taps.

The delay circuits and the taps, together, may implement a DFE. During normal operation of the receiver, this DFE may serve to drive the conductors of the summing node with differential voltage levels (output by the taps) that are based on the values of a quantity of most recently received bits output by the bit slicer as part of providing multiple parallel negative feedback loops. Together, these negative feedback loops tend to reduce the magnitudes of noise components of the received signal as the received signal conveys another bit of its bitstream to the input of the bit slicer to make detecting voltage levels and/or transitions between voltage levels in the received signal by bit slicer more reliable. However, in preparation for testing, the taps may be programmed with a coefficient value that changes the multiple parallel negative feedback loops into multiple parallel feedback loops that recurringly reverse the polarity of the differential voltage at the input of the bit slicer to cause self oscillation of at least the bit slicer.

The bit slicer may be driven by a clock generator to sample the voltages on the conductors of the summing node coupled to the input of the bit slicer at a regular interval that may be determined at least partly by the frequency of the clock signal provided by the clock generator to the bit slicer. During normal operation of the receiver to receive a bitstream, the bit slicer may analyze each of those samples to determine the polarity of a differential voltage at the input of the bit slicer (e.g., which of the two conductors at the input of the bit slicer has a high voltage level and which has a low voltage level) as part of determining whether a high or a low bit value (e.g., a bit value of "1" or "0") was most recently conveyed in the bitstream. Alternatively or additionally, during such normal operation of the receiver, the bit slicer may analyze those samples to determine whether a transition between high and low voltage levels has occurred in the signal received by the receiver since the last sample was taken by the bit slicer as part of determining whether a high or low bit value was most recently conveyed in the bitstream.

The test may be performed to test the propagation delay through the DFE and/or the sensitivity of the input of the bit slicer. With the taps programmed with coefficients to cause the DFE to provide multiple parallel feedback loops from the output of the bit slicer to the input of the bit slicer such that oscillation occurs, the output of the bit slicer may be a series of alternating high and low bit values that changes with each new bit value if the propagation delay through the DFE is low enough for the frequency at which the clock generator is currently operated. However, if there are occurrences of two or more adjacent bit values output by the bit slicer that are the same, then propagation delay through the DFE is not low enough to enable self oscillation at the current frequency of the clock generator. Also, if bit slicer outputs a series of bit values that are all the same (e.g., a so-called "stuck-at-zero" or "stuck-at-one" fault), then the input of the bit slicer may not be sensitive enough for the current differential voltage on the conductors of the summing node coupled to the input of the bit slicer. The test may be repeated at a variety of clock frequencies and/or with a variety of differential voltage levels output by at least the VGA to determine operating characteristics of at least the multiple parallel feedback loops provided by the DFE.

The test may be performed on a receiver of an IC following its fabrication and before it is encased in a package and/or before its installation into a computing device. Thus, the test may be performed to discern the performance characteristics of the receiver as part of sorting ICs that incorporate receivers capable of receiving data at a selected high transmission rate from ICs that incorporate one or more receivers that are not so capable. Alternatively or additionally, the test may be performed on a receiver of an IC following incorporation of that IC into a computing device as part of diagnosing an apparent failure in data communications that involve that receiver. Thus, the test may be performed to attempt to rule out the receiver (or at least a portion thereof) as the source of that failure. As yet another alternative, the test may be performed on a receiver of an IC incorporated into a computing device during use of the computing device, and may be performed in conjunction with measuring temperature(s) of the IC and/or voltage(s) of a power source that provides power to the IC. Thus, the test may be performed to determine what data transfer rate the receiver is currently able to support, given current temperature(s) of the IC and/or current voltage level(s) provided by the power source. As a result of such testing, changes may be dynamically made to the data transfer rate and/or to voltages used in signals transmitted to that receiver.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of an embodiment of a processing system 1000 incorporating a computing device 500 and one or more of controls 520, a camera 525 and a remote computing device 100. The computing device 500 may receive data from one or more of these devices 520, 525 and 100 at interfaces provided by one or more components of the computing device 525, and such data may be provided to the computing device 500 at a relatively high data transfer rate via one or more wired connections. In preparation for receiving such data, in response to an indication of an error having occurred in receiving such data and/or as part of scheduled maintenance, one or more receivers at one or more of those interfaces may be tested to characterize and/or confirm at least some aspects of their functionality.

More specifically, in various embodiments, the computing device 500 may incorporate one or more of a power supply 505, a processor component 550, a storage 560, a display interface 585 and an interface circuit 590 to enable reception of data from other devices. The interface circuit 590 may incorporate one or more interface controllers 595*a-c* to receive data via wired connections from one or more of such other devices as the controls 520, the remote computing device 100 and the camera 525, respectively. The storage 560 stores one or more of a control routine 540, test pattern data 535 and test results data 538.

As depicted, one or more of the interface controllers 595*a-c* may each include one or more receivers 570 by which a signal may be received from one or more of the devices 520, 100 and 525. In some embodiments, one or more of the interface controllers 595*a-c* may be implemented as a separate and distinct IC, and the interface circuit 590 may be a circuitboard that carries one or more of such ICs. In other embodiments, the interface circuit 590 may be an IC into which one or more of the interface controllers 595*a-c* may be incorporated.

Each of the interface controller 595*a-c* may provide an interface of the computing device 500 by which each of the devices 520, 100 and 525 may be coupled to the computing device 500 with a wired connection. Each of these interfaces may adhere to one or more widely known and used specifications for interfaces that may have been specialized to serve a specific range of applications. By way of example, the interface provided by the interface controller 595*a* may be configured to comply with one or more of the versions of the Universal Serial Bus (USB) specification promulgated by the USB Implementers Forum, Inc. of Beaverton, Oreg., which supports the connection of a wide variety of devices to computing devices, including various devices requiring relatively high speed serial I/O to support relatively high data transfer rates. A recently released version of the USB specification purports to support data transfer rates approaching 10 GBits/sec.

By way of another example, the interface provided by the interface controller 595b may be configured to comply with one or more versions of the Ethernet specification promulgated by the Institute of Electrical and Electronics Engineers (IEEE) of Piscataway, N.J., (also known as the IEEE 802.3 series of specifications), which has been widely adopted and used to implement wired networking in many homes and businesses. Versions of Ethernet implemented as four twisted pairs of conductors conveying differential signals that support data transfer rates of 25 GBits/sec per pair and approaching 50 GBits/sec per pair are starting to be adopted for commercial use.

By way of still another example, the interface provided by the interface controller 595c may be configured to comply with one or more versions of either the High-Definition Multimedia Interface (HDMI) specification promulgated by the HDMI Forum of Sunnyvale, Calif., or the DisplayPort specification promulgated by the Video Electronics Standards Association (VESA) of Newark, Calif. Both support the transfer of digital data representing motion video at high definition resolutions for both home entertainment and computer imaging applications. Recently announced versions of HDMI and DisplayPort support data transfer rates of 18 GBits/sec and 21 GBits/sec, respectively, as part of supporting the transfer of data representing motion video with still higher resolutions (e.g., "4K" or "ultra HD" resolutions).

As familiar to those skilled in the art, the above example specifications are only a sampling of the numerous forms of high speed wired I/O that have been developed over time to satisfy various needs. Despite their different development histories, many of these different forms of high speed wired I/O continue to be reworked to increase their data transfer rates, and in the process, are tending to use similar techniques to achieve those higher data transfer rates. One such developing commonality is the use of differential signaling to both reduce electromagnetic emissions from the conductors used and to decrease susceptibility to electromagnetic interference from other sources. Differential signal also better enables the use of lower voltages and reduced differences between higher and lower voltage levels. As recognizable to those skilled in the art, such reductions in voltage levels and/or differences in voltage levels is more compatibility with the ever decreasing operating voltages of many ICs, and enables quicker transitions between the higher and lower voltage levels enabling high data rates. Another such developing commonality is representing high and low bit values as either occurrences or absences of occurrence of transitions between high and low voltage levels, instead of using the voltage levels, themselves. As recognizable to those skilled in the art, occurrences of transitions between voltage levels can often be detected by a receiver more quickly than detecting specific voltage levels where electromagnetic noise in a received signal may prevent a voltage level to reach and settle at specific voltage level by the time the voltage level is sampled by a receiver. However, each of the receivers 570 may be employed in receiving a bitstream in which bit values are encoded using any of a variety of encoding algorithms in which voltage levels and/or transitions between voltage levels are employed to convey bit values.

With characteristics of such different forms of high speed wired I/O continuing to converge, the design of receivers employed in such I/O continue to take on greater similarity to each other. Among such converging similarities may be the use of one or more feedback loops to use the bit value(s) of one or more of the most recently received bits to enhance the accuracy of determining the bit values of subsequently received bits by reducing the magnitude of noise portions of the received signal. Thus, testing techniques employed to test a receiver 570 of one of the interface controllers 595a-c may be more similar to the testing techniques employed to test a receiver of another of the interface controllers 595a-c, than not.

Among some of the differences that may persist between different forms of high speed wired I/O may be the use of multiple receivers at an interface to support the receipt of bits of data in a parallel or quasi-parallel manner versus the use of a single receiver at another interface to support the receipt of bits of data in a serial manner. Thus, a test involving a receiver of a given interface may be extended to all of the receivers of that interface. Doing so may be deemed necessary since an error involving any one of the receivers may render the entire interface unusable and/or necessitate corrective measures applied to the entire interface, even though all of the other receivers of that interface may be fully functional.

The control routine 540 incorporates a sequence of instructions operative on the processor component 550 in its role as a main processor component of the computing device 500. In executing the control routine 540, the processor component may operate one or more components of one of the receivers 570 incorporated into one or more of the interface controllers 595a-c to test aspects of the functionality of that one of the receivers 570 by causing self oscillation to occur among a subset of the components of that one of the receivers 570. The processor component 550 may be caused by the control routine 540 to perform such a test as part of initialization of the computing device 500, such as following a reset or a powering up of the computing device 500. Alternatively or additionally, the processor component 550 may be caused by the control routine 540 to await an opportunity to perform such a test, such as the passage of a predetermined period of time since signal activity was last detected by one of the receivers 570. As yet another alternative, the processor component 550 may be caused by control routine to perform such a test in response to a detection of a data error in receiving data through an interface that employs one of the receivers 570.

The processor component 550 may, as part of performing a test of one or more of the receivers 570, obtain measurements of one or more conditions of components of the computing device 500 that may affect the performance of one or more of the receivers. As familiar to those skilled in the art, factors such as a relatively high temperature in the vicinity of a receiver can adversely affect the performance of that receiver as it is operated, and can degrade the performance of the receiver over time, depending on how often the receiver is operated in relatively high temperatures. Indications of what measurements to obtain and/or combinations of different test parameters to use in each performance of testing of one or more of the receivers 570 may be retrieved by the processor component 550 from the test pattern data 535. The results of tests performed on one or more of the receivers 570 may be stored by the processor component 550 within the storage 560 as at least part of the test results data 538. Following such testing, the processor component 550 may transmit the results of such testing to another device (e.g., the remote device 100) via a network (e.g., one of the wired connections discussed above) or the processor component 550 may operate the display interface 585 to cause an indication of the results to be visually presented (e.g., on a display 580 coupled to the device interface 585).

Figure 2:
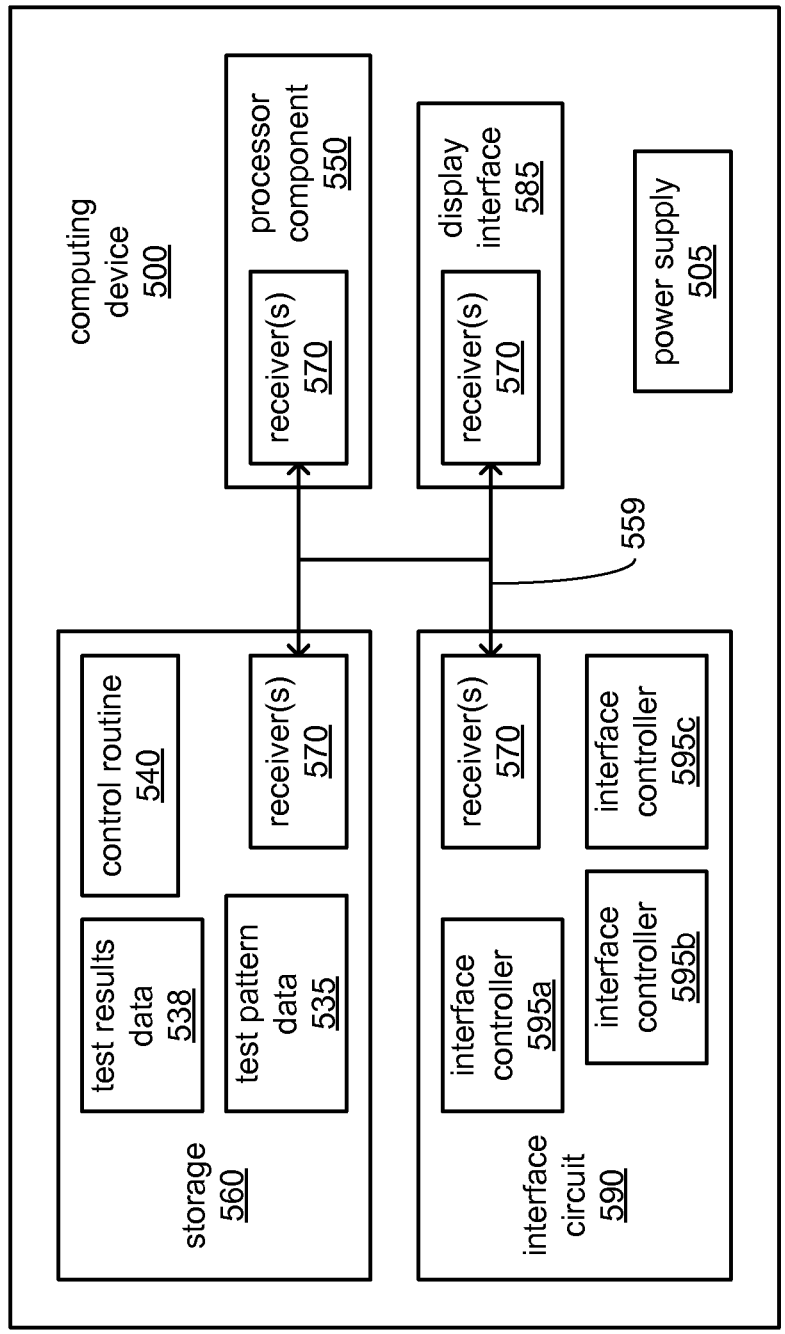
FIG. 2 illustrates an example embodiment of components of a computing device receiving data from other components.

FIG. 2 illustrates a block diagram of an embodiment of the computing device 500 in which testing of receivers employed in exchanging data between components within the computing device 500 may be performed. As depicted, one or more of the processor component 550, the storage 560, the display interface 585 and the interface circuit 590 may each include one or more receivers 570 by which a signal may be received by one of these components from another of these components.

Not unlike the interface controllers 595a-c, each of the processor component 550, the storage 560, the display interface 585 and the interface circuit 590 may provide an interface that incorporates one or more of the receivers 570 and that may adhere to one or more widely known and used specifications for interfaces. By way of example, the storage 560 may incorporate an interface that may be configured to comply with one or more versions of the double data rate (DDR) memory interface promulgated by Joint Electron Device Engineering Council (JEDEC) Solid State Technology Association of Arlington, Va. Current versions of the derivative DDR3 specification support data transfer rates of up to 17 GBytes/sec across a wide set of data channels with 1 GHz clock on which transfers occur on both transitions in each cycle. By way of another example, the display interface 585 may incorporate an interface that may be configured to comply with one or more versions of the Peripheral Component Interconnect Express (PCI-E) specification promulgated by the PCI Special Interest Group (PCI-SIG) of Beaverton, Oreg. Current versions of the PCI-E specifications support up to 8 GBits/sec through each differential signal pair. Thus, between components within the computing device 500, there may be high speed wired I/O making use of embodiments of the receiver 570 that may be tested just as the earlier described embodiments of the receiver 570 employed in receiving data from devices external to the computing device.

As also depicted, these components 550, 560, 585 and/or 590 may exchange signals conveying data via an interconnect 559 that couples these components. The interconnect 559 may incorporate one or more of any of a variety of types of bus made up of electrical conductors to convey signals that convey data. The interconnect 559 may also incorporate one or more of any of a variety of types of buffer components, signal converters, protocol converters, serial-to-parallel and/or parallel-to-serial converters, level shifters, crosspoint switches, etc.

In some embodiments, one or more of the processor component 550, the storage 560, the display interface 585 and the interface circuit 590 may each be implemented as a separate and distinct IC that may be connected to others of these components through conductive traces formed in a circuitboard. In other embodiments, one or more of these components may be implemented on separate semiconductor dies that may be assembled together within a common IC package (e.g., a multi-chip module) in which signals received by one or more of the receivers 570 may be exchanged between such components through a conductive traces formed in a substrate underlying the dies or gold wires extending therebetween.

Again, the processor component may operate one or more components of one of the receivers 570 incorporated into one or more of the processor component 550, the storage 560, the display interface 585 or the interface circuit 590 to test aspects of the functionality of that one of the receivers 570 by causing self oscillation to occur among a subset of the components of that one of the receivers 570. Again, the processor component 550 may be caused by the control routine 540 to perform such a test as part of initialization of the computing device 500, opportunistically during a lack of signal activity at the input of one of the receivers 570, and/or in response to a detection of a data error in receiving data through an interface that employs one of the receivers 570. And again, the processor component 550 may, as part of performing a test of one or more of the receivers 570, obtain measurements of one or more conditions of components of the computing device 500 that may affect the performance of one or more of the receivers.

Figure 3A:
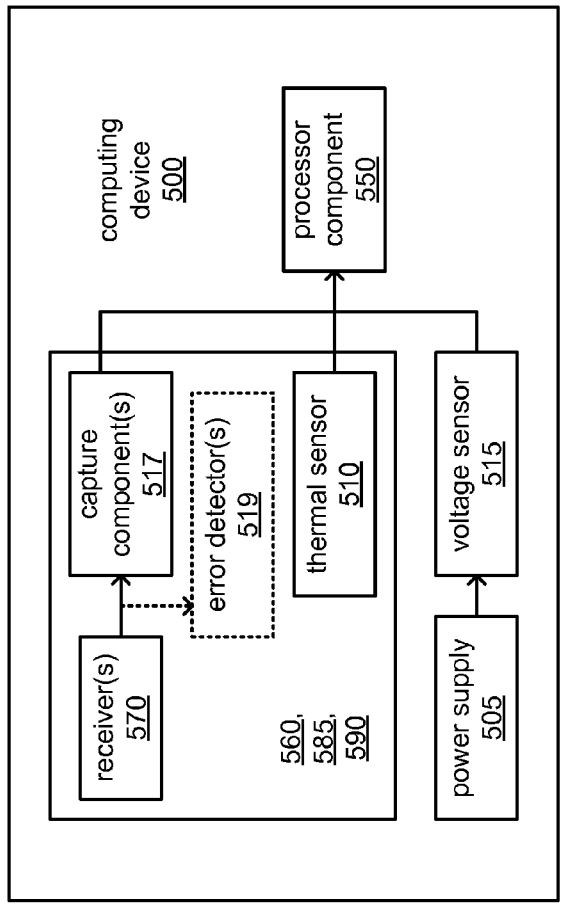
FIGS. 3A and 3B illustrate example embodiments of components of a computing device testing one or more receivers.
Figure 3B:
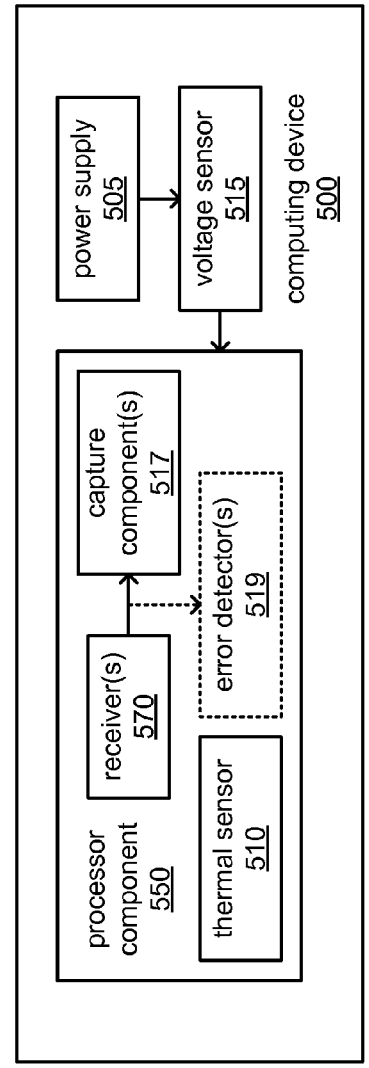

FIGS. 3A and 3B, together, depict example embodiments of the receiver 570 incorporated into various components of the computing device 500 along with other components to enable testing of the receiver 570. Turning to FIG. 3A, one or more of the storage 560, the display interface 585 and the interface circuit 590 may incorporate at least one of an embodiment of the receiver 570 along with at least one capture component 517 and/or at least one error detector 519. Turning to FIG. 3B, the processor component 550 may incorporate at least one of an embodiment of the receiver 570 along with at least one of the capture component 517 and/or at least one of the error detector 519.

Referring to both FIGS. 3A and 3B, and as will be discussed in greater detail, an output of the receiver 570 may be coupled to the capture component 517 to capture a quantity of the bit values most recently output by the receiver 570 to enable that quantity of bit values to be analyzed together to determine whether the receiver passed or failed the test. As will be explained in greater detail, the capture component 517 may capture a quantity of bit values most recently output by the receiver 570 to enable that quantity of bits to be analyzed as part of determining whether the receiver 570 passed the test. Further, that output of the receiver 570 may be additionally coupled to the error detector 519 to analyze the bits of the incoming bitstream during normal operation of the receiver as part of employing a cyclic redundancy check (CRC) and/or another algorithm to detect an error in receiving one or more bits. In response to detecting such an error, the error detector 519 signals the processor component 550 concerning that error, and the processor component (in executing the control routine 540) may operate various components of the receiver 570 to perform a test.

As also depicted, one or more of the processor component 550, the storage 560, the display interface 585 and the interface circuit 590 may incorporate a thermal sensor 510 to monitor temperature. In some embodiments, the thermal sensor 510 may be positioned within an IC package in which one of these components 550, 560, 585 or 590 is encased to monitor the overall temperature of that component within that IC package. In other embodiments, the thermal sensor 510 may be positioned within the vicinity of one or more of the receiver 570 to monitor the temperature(s) of the one or more receivers 570.

As further depicted, the computing device 500 may incorporate a voltage sensor 515 to monitor the voltage level of one or more voltage outputs of the power supply 505. As familiar to those skilled in the art, an IC may require electric power provided at more than one voltage level simultaneously. Further, the electric power provided at one of those multiple voltages may be employed specifically by the transmitters and/or receivers that exchange signals with other ICs. In some embodiments, the voltage sensor 515 may monitor the voltage at which electric power is provided to one of the processor component 550, the storage 560, the display interface 585 and the interface circuit 590 for use by one or more of the receivers 570.

As previously discussed, during a test of one or more of the receivers 570, indications of temperature and/or voltage level of a power supply may be recorded alongside indications of whether one or more receivers 570 that are tested either failed or passed. Again, this may be done to determine the operating characteristics of one or more of the receivers 570, either as part of sorting ICs to identify those that can support higher data transfer rates or as part of determining a cause of a failure.

Figure 4:
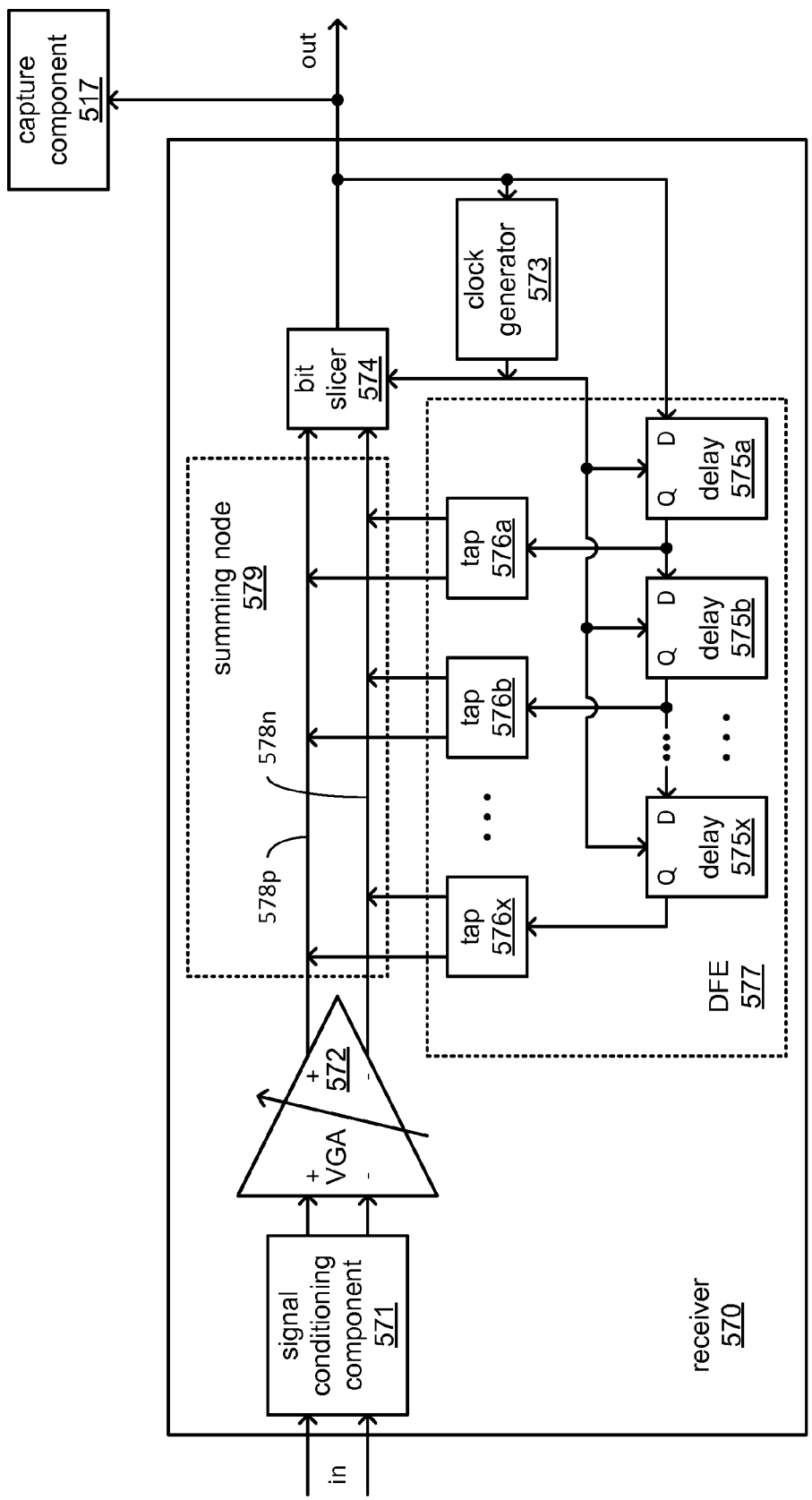
FIG. 4 illustrates an example embodiment of testing a receiver.

FIG. 4 depicts aspects of an example of testing an embodiment of the receiver 570. As depicted, the receiver 570 may incorporate one or more of a signal conditioning component 571, a VGA 572, a clock generator 573, a bit slicer 574, multiple delay circuits 575a-x, multiple taps 576a-x and a pair of conductors 578n and 578p. As will be explained in greater detail, the delay circuits 575a-x and the taps 576a-x may cooperate to form a DFE 577, and the conductors 578n and 578p may form at least a portion of a summing node 579. The receiver 570 provides an input at which a signal conveying a bitstream of bits of data may be received in which the bit values may be encoded in any of a variety of ways, and an output at which the receiver 570 may output the series of the bit values retrieved from the bitstream.

As previously discussed, the capture component 517 may be coupled to the output of the receiver to capture a quantity of bit values most recently output by the receiver for analysis as part of determining whether the receiver passes testing. As will be explained in greater detail, the coupling of the capture component 517 to the output of the receiver 570 to so capture a quantity of bit values for analysis avoids the possibility of adversely affecting the functionality of the receiver 570 by either incorporating a capture or other test-related component into the receiver 570 or coupling an external capture or other test-related component to a conductor within the receiver 570.

As depicted, and as previously discussed, the signal received by the receiver 570 may be a differential signal that may be conveyed to the receiver 570 via a pair of conductors in which the two conductors are each driven with a different one of a higher voltage level and a lower voltage level at any given time, and in which one conductor makes transitions between the higher and lower voltage levels that are opposite in polarity to the transitions made between higher and lower voltages levels on the other conductor. As previously discussed, the use of differential signaling may enable the use of higher and lower voltages having voltage levels with a smaller differential voltage therebetween than may be possible with single-ended signaling. Such a smaller differential voltage between higher and lower voltages may enable each transition therebetween to be performed more quickly, thereby further enabling higher data transfer rates. However, although the receiver 570 is depicted and described herein as receiving a differential signal at its input, other embodiments of the receiver 570 are possible in which a single-ended signal may be received.

As depicted, and as previously discussed, the signal conditioning component 571 may serve as the component of the receiver 570 that directly receives the incoming signal conveying the bitstream. Again, in at least some embodiments, the signal conditioning component 571 may be implemented as a front end equalizer that employs any of a variety of types of equalizer circuit (e.g., FFE, CTLE, etc.) to counter what may be unequal attenuation of different frequency components of the signal during its transmission to the receiver 570. In some embodiments, such a front end equalizer implementation of the signal conditioning component 571 may incorporate one or more digital filters that may be programmed with one or more coefficients to implement a selected type of equalizer. As familiar to those skilled in the art, such coefficients may cause those digital filters to implement one or more transforms on the received signal as an approach to boosting and/or attenuating selected frequency components of the received signal.

As previously discussed, in preparation for performing a test of the receiver 570, the signal conditioning component 571 may be configured to effectively disconnect other components of the receiver 570 from signal activity occurring at the input of the receiver 570 (e.g., the input of the signal conditioning component 571). In embodiments in which the signal conditioning component 571 incorporates one or more digital filters to implement one or more transforms as part of a front end equalizer providing equalization during normal operation, those digital filters may be programmed with coefficients to implement one or more transform functions that may attenuate most, if not all, of the frequency components of any incoming signal to a low magnitude of differential voltage level (of positive or negative polarity) or to a zero level of differential voltage at the output of the signal conditioning component 571.

As depicted, the output of the signal conditioning component 571 is provided to the input of the VGA 572. Again, where the receiver 570 receives a differential signal, the signal conditioning component 571 may output a differential signal to the input of the VGA 572 via a pair of conductors, as depicted. As also depicted, the output of the VGA 572 may, correspondingly, be a differential output driven by the VGA 572 onto the pair of conductors 578n and 578p that make up the summing node 579 at which the outputs of the VGA 572 and of the taps 576a-n are coupled to effect summing of the differential voltage levels that each outputs. As further depicted, the pair of conductors 578n and 578p may be coupled to the input of the bit slicer 574 to convey the results of such summing at the summing node 579 to the input of the bit slicer 574.

As previously discussed, in preparation for performing a test of the receiver 570, the VGA 572 may be configured to output a bias voltage onto the conductors 578n and 578p of the summing node 579. In embodiments in which a differential signal is output by the VGA 572 to the input of the bit slicer 574, the VGA 572 may output a relatively low differential bias voltage (of either polarity) onto the conductors 578n and 578p of the summing node 579. In embodiments in which the VGA 572 is capable of outputting a bias voltage of a selectable level onto the conductors 578n and 578p, the VGA 572 may be configured to make use of such a capability to do so. In such embodiments, it may be sufficient to configure the signal conditioning component 571 to effectively disconnect other components of the receiver 570 from the input of the receiver 570 in a manner that results in the signal conditioning component 571 outputting either a steady low differential voltage (of either polarity) to the input of the VGA 572 or outputting a zero differential voltage level.

However, in embodiments in which the VGA 752 may not support outputting a bias voltage with a selectable voltage level and in which the signal conditioning component 571 incorporates one or more configurable filters normally used to implement a form of front end equalizer, the provision of a selected differential bias voltage on the conductors 578n and 578p may entail configuring the signal conditioning component 571 and the VGA 572 to cooperate to generate a bias voltage. This may entail configuring the signal conditioning component 571 to output a steady differential voltage of a known level to the input of the VGA 572 while also effectively disconnecting the input of the receiver 570 from signal activity occurring at that input. Where the signal conditioning component 571 incorporates one or more digital filters, this may entail programming the signal conditioning component 571 with coefficient(s) to implement one or more transforms that both effectively disconnect the input of the receiver 570 and output the selected differential voltage level to the input of the VGA 572. The gain of the VGA 572 may then be set to increase or decrease that differential voltage level at the input of the VGA 572 to cause the VGA 572 to output the desired differential bias voltage onto the conductors 578n and 578p of the summing node 579.

In still other embodiments, and as familiar to those skilled in the art, the signal conditioning component 571 and the VGA 572 may be combined into a single component that may incorporate multiple digital filters to perform the above described functions of both the signal conditioning component 571 and the VGA 572. In such embodiments, the function of amplifying signals received at the input of the receiver 570 with a variable gain (e.g., the function of the VGA 572) may be implemented by programming one or more digital filters with coefficients to implement one or more transforms to provide such amplification with a variable gain. Thus, the VGA 572 may be implemented as a gain stage of another component, instead of physically existing as a component that is physically distinct from other components. In such embodiments, causing the output of a differential bias voltage onto the conductors 578n and 578p by such a combined component may entail programming one or more of the digital filters thereof with coefficients to implement one or more transform functions to generate such an output. Regardless of the manner in which a differential bias voltage is caused to be output onto the conductors 578n and 578p, such a differential bias voltage may continue to be so output for at least the duration of testing of the receiver 570.

The bit slicer 574 may be driven by the clock generator 573 to sample the differential voltage between the conductors 578n and 578p of the summing node 579 at a regular recurring interval of time determined by the frequency of the clock signal output by the clock generator 573. The bit slicer 574 may analyze each of those samples to determine whether a high or low bit value for the most recently received bit of the bitstream has been conveyed by the signal received by the receiver 570 (and conveyed to the input of the bit slicer 574 through at least the signal conditioning component 571, the VGA 572 and the summing node 579).

As depicted, the output of the bit slicer 574 may be a single-ended output onto a single conductor coupled to one or more other components within the IC into which the receiver 570 may be incorporated. Within the receiver 570, the output of the bit slicer 574 may be coupled to an input of the clock generator 573 in embodiments in which the clock generator 573 is able to adjust the frequency of the clock signal it outputs and/or is able to skew that clock signal to better synchronize that clock signal with transitions detected in the signal received by the receiver 570. In some embodiments, the bit slicer 574 may, itself, determine the degree to which the clock generator 573 should skew the clock signal generated by the clock generator 573 to ensure that the samples taken by the bit slicer 574 are timed to occur between occurrences of transitions between voltage levels in the received signal, and not during those transitions.

As depicted, the output of the bit slicer 574 may also be coupled to an input of the delay circuit 575a at the head of a chain of the delay circuits 575a-x in which the output of one of the delay circuits 575a-x is coupled to the input of the next one of the delay circuits 575a-x in the chain all the way to the delay circuit 575x at the tail of the chain. The chain of delay circuits 575a-x may latch bit values output by the bit slicer 574 and then shift those bit values along the chain as the bit slicer 574 outputs each new bit value. In effect, the chain of delay circuits 575a-x serves to store a quantity of the bit values most recently output by the bit slicer 574 in a manner akin to the operation of a first-in-first-out (FIFO) buffer in which the least recently stored bit value (stored within the delay circuit 575x) of the quantity of stored bit values is discarded as each new bit value output by the bit slicer 574 is latched (at the input of the delay circuit 575a). The delay circuits 575a-x may all be driven by the same clock signal generated by the clock generator 573 that drives the sampling performed by bit slicer 574. In this way, operation of the delay circuits 575a-x to latch and shift bit values along the chain thereof may be synchronized to the output of bit values by the bit slicer 574.

As depicted, the outputs of each of the delay circuits 575a-x may also be coupled to a corresponding one of the taps 576a-x. The taps 576a-x may, together, be programmed with one or more coefficient values to cause each of the taps 576a-x to output a differential voltage of a selected voltage level onto the conductors 578n and 578p of the summing node 579, where those differential voltages will be summed together with the differential bias voltage output by the VGA 572, before the resulting differential sum thereof is provided to the input of the bit slicer 574. Thus, the combination of the delay circuits 575a-x and the taps 576a-x that make up the DFE, along with the summing node 579, may be caused to provide multiple parallel pathways that each serve as a feedback loop extending from the single-ended output of the bit slicer 574 and back to the differential input of the bit slicer 574. More precisely, the start of a single feedback loop begins at the coupling of the output of the bit slicer 574 to the input of the delay circuit 575a at the head of the chain of delay circuits 575a-x. That single feedback loop is then split into multiple parallel feedback loops by the delay circuits 575a-x by the coupling of the outputs thereof to inputs of corresponding ones of the taps 576a-x. The multiple parallel feedback loops then extend through individual ones of the taps 576a-x and come back together again at the input of the bit slicer 574 through the summing node 579.

The taps 576a-x may, together, be programmed to employ the bit value that each receives from a corresponding one of the delay circuits 575a-x in determining the polarity with which each outputs a differential voltage onto the 578n and 578p of the summing node 579. Thus, aspects of what is output by the taps 576a-x in response to the inputs that each of the taps 576a-x receives may be programmable.

During normal operation of the receiver 570, the taps 576a-x may be configured to each output a differential voltage with a voltage level and a polarity selected to tend to provide negative feedback that tends to reduce the magnitudes of the differential voltages of noise portions of the received signal output by the VGA 572 to the input of the bit slicer 574. More precisely, each of the taps 576a-x outputs a selected voltage level with a polarity that is controlled by one of the bit values of the quantity of bit values most recently output by the bit slicer 574 and stored by the chain of delay circuits 575a-x. Thus, depending on the bit values output by each of the delay circuits 575*a-x* to corresponding ones of the taps 576*a-x*, there may be two or more of the taps 576*a-x* that output differential voltages with opposing polarities such that two or more of those output differential voltages may tend to "cancel out" each other. However, when the taps 576*a-x* are configured to each provide negative feedback based on the bit values that each receives, the sum of the differential voltages provided by the taps 576*a-x* at the summing node 579, when added to the differential output of the received signal by the VGA 572, tends to reduce the strength of noise portions of the received signal relative to portions of the received signal that convey bit values to make accurate detection of indications of bit values in those portions of the received signal by the bit slicer 574 easier.

However, in preparation for testing the receiver 570, one or more of the taps 576*a-x* may be configured to each output a differential voltage with a voltage level and a polarity selected to be capable of overcoming the magnitude and/or polarity of the differential bias voltage output by the VGA 572 as part of attempting to cause inversion of the polarity of the differential voltage at the input of the bit slicer 574 with each sample taken by the bit slicer 574, thereby causing self oscillation at both the input and output of the bit slicer 574 during performance of the test. If the test is successful at a selected frequency, then such self oscillation should cause the bit slicer 574 to output a series of alternating bit values in which there is toggling between high and low bit values with each sample taken by the bit slicer 574 such that no two adjacent bit values output by the bit slicer 574 are the same. In essence, each bit value that is output by the bit slicer 574 should, through the multiple parallel feedback loops earlier described, cause an inversion of the polarity of the differential voltage at the input of bit slicer 574 such that the next bit value output by the bit slicer 574 is always different from the one before it. It should be noted that such testing may be performed using multiple ones of the taps 576*a-x* to verify aspects of overall functionality made possible by the multiple parallel feedback loops, or such testing may be performed using a single one of the taps 576*a-x* to verify aspects of the functionality made possible with a single one of the multiple parallel feedback loops. Indeed, such testing may be done using each of the taps 576*a-x*, one at a time, in separate iterations of testing.

As previously discussed, other preparations for testing the receiver 570 may include causing a bias voltage to be driven onto the conductors 578*na* and 578*p* of the summing node 579 by the VGA 572. The voltage level and the polarity of the bias voltage on the conductors 578*n* and 578*p* may be selected to place the input of the bit slicer 574 into a known initial state prior to the start of testing of the receiver 570. In essence, the bias voltage placed onto the conductors 578*n* and 578*p* may serve to precharge the input of the bit slicer 574 in lieu of there being a signal received by the receiver 570 and conveyed to the input of the bit slicer 574 through the VGA 572 to do so. More precisely, the bias voltage may be selected to be either above or below the natural offset voltage of the input of the bit slicer 574, which may be a differential voltage of only a few millivolts in magnitude. Also, the bias voltage may be selected to not have a magnitude that is so high (either positive or negative) as to be incapable of being overcome by the output(s) of one or more of the taps 576*a-x*.

FIGS. 5A and 5B each illustrate an example of results of performing a test on an embodiment of the receiver 570. FIG. 5A illustrates an example of a progression of changes in various voltage levels leading to passage of the test. FIG. 5B illustrates an example of a progression of changes in various voltage levels leading to failing the test. Both FIGS. 5A and 5B depict a progression of changes in various signals just before and just after commencement of testing such that some aspects of preparation for testing are depicted.

Turning to FIG. 5A, as previously discussed, preparations for performing a test of an embodiment of the receiver 570 may include configuring the VGA 572 and/or the signal conditioning component 571 to cause a differential bias voltage to be output by the VGA 572 onto the conductors 578*n* and 578*p* of the summing node 579. As depicted, the differential bias voltage may continue to be so output by the VGA 572 throughout performance of the test (e.g., through the depicted timepoints T1, T2, T3 and onward at least until the end of the test). With testing having not yet begun (e.g., prior to timepoint T1), none of the taps 576*a-x* may yet output differential voltages onto the conductors 578*n* and 578*p*, and thus, the input of the bit slicer 574 may be driven only by the differential bias voltage output by the VGA 572. FIG. 5A depicts how the differential output of the VGA 572 and the lack of outputs from at least the taps 576*a* and 576*b* are summed at the summing node 579 to provide the input of the bit slicer 574 with only the differential bias voltage output by the VGA 572.

Following commencement of the output of the differential bias voltage, the clock generator 573 may be enabled to commence outputting a clock signal. In so doing, the clock generator 573 may drive the bit slicer 574 to sample the differential voltage present at the input of the bit slicer 574 at timepoint T1. In various embodiments, the bit slicer 574 may be configured to correlate the polarity of the differential voltage at its input upon commencing operation to either a high or a low bit value. As depicted, the differential bias voltage provided to the input of the bit slicer 574 by the VGA 572 is correlated to a high bit value and the single-ended output of the bit slicer 574 may transition from a low to a high state to indicate a high bit value (e.g., a bit value of "1").

With the output of the bit slicer 574 coupled to the input of the delay circuit 575*a*, and with the output of the delay circuit 575*a* coupled to the input of the tap 576*a*, the delay circuit 575*a* conveys the now changed output of the bit slicer 574 to the input of the tap 576*a*. As previously discussed, in preparation for testing the receiver 570 (e.g., prior to timepoint T1), the taps 576*a-x* may be configured to each provide a differential output that implements a feedback loop that causes inversion of the polarity of the differential voltage at the input of the bit slicer 574 with each sample that is taken by the bit slicer 574 of the differential voltage at its input. Thus, in response to the changed output relayed to the input of the tap 576*a*, the tap 576*a* outputs a differential voltage onto the conductors 578*n* and 578*p* with a polarity in opposition to the polarity of the differential bias voltage output by the VGA 572, and with a voltage level of a greater magnitude than the magnitude of the voltage level of the differential bias voltage.

FIG. 5A depicts how the differential bias voltage output by the VGA 572, the opposing differential voltage output by the tap 576*a* and the lack of output from at least the tap 576*b* are summed at the summing node 579 to provide a new input to the bit slicer 574 that has a polarity opposite to that of the differential bias voltage. Again, FIG. 5A illustrates an example of passage of the test by an embodiment of the receiver 570, and therefore, the propagation delay through at least the delay circuit 575*a* and the tap 576*a* are low enough to enable this opposing differential voltage to be driven onto the conductors 578*n* and 578*p* to be summed with the differential bias voltage before timepoint T2 at which the bit slicer 574 again samples the summed differential voltage at its input.

As previously discussed, the bit slicer 574 analyzes each new sample to determine whether a high or low bit value has been most recently conveyed. Again, the bit slicer 574 may analyze voltage levels and/or transitions between voltage levels to retrieve bit values of bits in the bitstream conveyed by the received signal. In response to the reversal of polarity that has occurred between timepoints T1 and T2 due to the opposing differential voltage output by the tap 576a, the single-ended output of the bit slicer 574 may transition from a high to a low state to indicate a low bit value (e.g., a bit value of "0").

Again, with the output of the bit slicer 574 coupled to the input of the tap 576a through the delay circuit 575a, the tap 576a responds to the changed output of the bit slicer 574 by outputting a differential voltage onto the conductors 578n and 578p with the same polarity as that of the differential bias voltage output by the VGA 572. Thus, the differential voltage output of the tap 576a now reinforces the differential bias voltage (e.g., now adds to the voltage level of the differential bias voltage, instead of subtracting from it). Again, the tap 576a does so with a voltage level of a greater magnitude than the magnitude of the voltage level of the differential bias voltage. However, with the output of the delay circuit 575a coupled to the input of the delay circuit 575b (as the next delay circuit in the chain of delay circuits 575a-x), the high bit value originally output by the delay circuit 575a is now shifted to the delay circuit 575b at timepoint T2. With the output of the delay circuit 575b coupled to the input of the tap 576b, the tap 576b now effectively takes over for the tap 576a in outputting a differential voltage onto the conductors 578n and 578p with the polarity in opposition to the polarity of the differential bias voltage output by the VGA 572, and with a voltage level of a greater magnitude than the magnitude of the voltage level of the differential bias voltage.

FIG. 5A depicts how the differential bias voltage output by the VGA 572, the reinforcing differential voltage output by the tap 576a, and the opposing differential voltage output by the tap 576b (along with what may be a lack of output by one or more taps) are summed at the summing node 579 to provide a new input to the bit slicer 574 that has the same polarity as the differential bias voltage. Again, FIG. 5A illustrates an example of passage of the test by an embodiment of the receiver 570, and therefore, the propagation delay through at least the delay circuits 575a-b and the taps 576a-b are low enough to enable both of the reinforcing and opposing differential voltages to be driven onto the conductors 578n and 578p to be summed with the differential bias voltage before timepoint T3 at which the bit slicer 574 again samples the summed differential voltage at its input.

Again, the bit slicer 574 analyzes the new sample to retrieve a bit value. In response to the reversal of polarity that has occurred between timepoints T2 and T3, the single-ended output of the bit slicer 574 may now transition from a low to a high state to once again indicate a high bit value (e.g., a bit value of "1"). Thus, due to a low enough propagation delay through components of the DFE 577, the output of the bit slicer 574 is caused to toggle with each new sample taken by the bit slicer 574 such that the bit slicer 574 is caused to self oscillate.

Turning to FIG. 5B, the depicted events from before timepoint T1 and through the transition in the output of the bit slicer 574 prior to timepoint T2 are identical to what was depicted in FIG. 5A. However, FIG. 5B illustrates an example of failure of the test by an embodiment of the receiver 570. Therefore, the propagation delay through one or both of the delay circuit 575a and the tap 576a may be excessive enough to prevent the opposing differential the tap 576a from outputting a differential voltage in opposition to the differential bias voltage until after timepoint T2 in FIG. 5B, instead of before timepoint T2 as depicted in FIG. 5A.

As a result, when the bit slicer 574 samples the differential voltage at its input at timepoint T2, the bit slicer 574 detects no change in polarity between the samples taken at timepoints T1 and T2. In response, the bit slicer 574 continues to output an indication of a high bit value (e.g., a bit value of "1"), which provides an indication to the capture component 517 that the receiver 570 has failed the test due to an excessively long propagation delay through at least one of the multiple parallel feedback loops provided by the DFE 577.

Returning to FIG. 4, as has been discussed, testing of one or more of the receivers 570 of an IC may be performed to test the propagation delay through the DFE 577 and/or the sensitivity of the input of the bit slicer 574. In testing the sensitivity of the input of the bit slicer 574, the voltage level of the differential bias voltage output by the VGA 572 and/or the voltage level of the differential voltages output by the taps 576a-x may be selected to cause one or more specific differential voltages of either polarity to be provided to the input of the bit slicer 574 to determine the smallest differential voltage of either or both polarities that can be detected by the bit slicer 574. Insufficient sensitivity to detect a specific differential voltage of one or the other polarity may be revealed by a "stuck-at-zero" or "stuck-at-one" output of the bit slicer 574 in which the bit slicer 574 continuously to output a high or low bit value during testing through numerous clock cycles, which is indicative no self oscillation taking place.

In testing the propagation delay through the DFE 577, again, a series of alternating high and low bit values output by the bit slicer 574 with no adjacent ones of those bit values being the same indicates success in causing at least the bit slicer 574 to self oscillate, which can only occur if the propagation delay through the multiple parallel feedback loops provided by the DFE 577 is low enough. If the propagation delay is low enough for the clock frequency tested to cause such self oscillation, then the propagation delay is low enough to enable the DFE 577 to serve its normal function of tending to reduce noise portions of the signal received by receiver 570 at the input of the bit slicer 574 during normal operation of the receiver 570. Again, if the bit slicer 574 outputs a series of bit values in which two or more adjacent bit values are the same, then the propagation delay may not be low enough for the clock frequency that is tested.

However, as recognizable to those skilled in the art, there may be a degree of interplay between failure of a receiver due to excessive propagation delay through the DFE and failure of a receiver due to insufficient sensitivity of the bit slicer 574. As a result, multiple combinations of clock frequency of the clock signal output by the clock generator 573, voltage levels and/or polarities of the differential bias voltage, and/or voltage levels output by the taps 576a-x may need to be tested to distinguish one type of failure from the other. By way of example, where the propagation delay through the DFE is sufficiently high, then failure may continue to result at a given clock frequency regardless of what voltage settings are employed during testing. However, there may be instances in which configuring the taps 576a-x to drive a sufficiently high magnitude of differential voltage level onto the conductors 578*n* and 578*p* may overcome a propagation delay this marginally close to too long. By way of another example, where the input of the bit slicer 574 requires a sufficiently high magnitude of differential voltage be applied to its input to be detected, then failure may continue to result when more normal magnitudes of differential voltage are tested at the input of the bit slicer 574 regardless of what frequency the clock generator 573 is set to.

Again, testing may be performed on one or more receivers 570 of an IC following its fabrication and before it is encased in a package and/or before its installation into a computing device. Alternatively or additionally, testing may be performed on one or more receivers 570 of an IC following incorporation of that IC into the computing device 500 as part of debugging an apparent failure in data communications that involve one or more of those receivers 570 of a component of the computing device 500. Again, testing may be performed to rule out the one or more receivers 570 as the source of a failure.

As yet another alternative, testing may be performed opportunistically on one or more receivers 570 of an IC incorporated into the computing device 500 in which the one or more receivers 570 may be tested at a time when their use is not required or at a recurring interval to check their current operating characteristics. More specifically, various clock frequencies and/or voltage level settings may be tested to determine if current operating conditions (e.g., current temperature and/or current voltage level of electric power from the power supply 505) should lead to a change in data transfer rate. Thus, the data transfer rate at which one or more of the receivers 570 are caused to receive bit values in a signal conveying a bitstream may be dynamically changed in response to current operating conditions within the computing device 500.

Returning to FIG. 1, in various embodiments, the processor component 550 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are in some way linked.

In various embodiments, the storage 560 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

Figure 6:
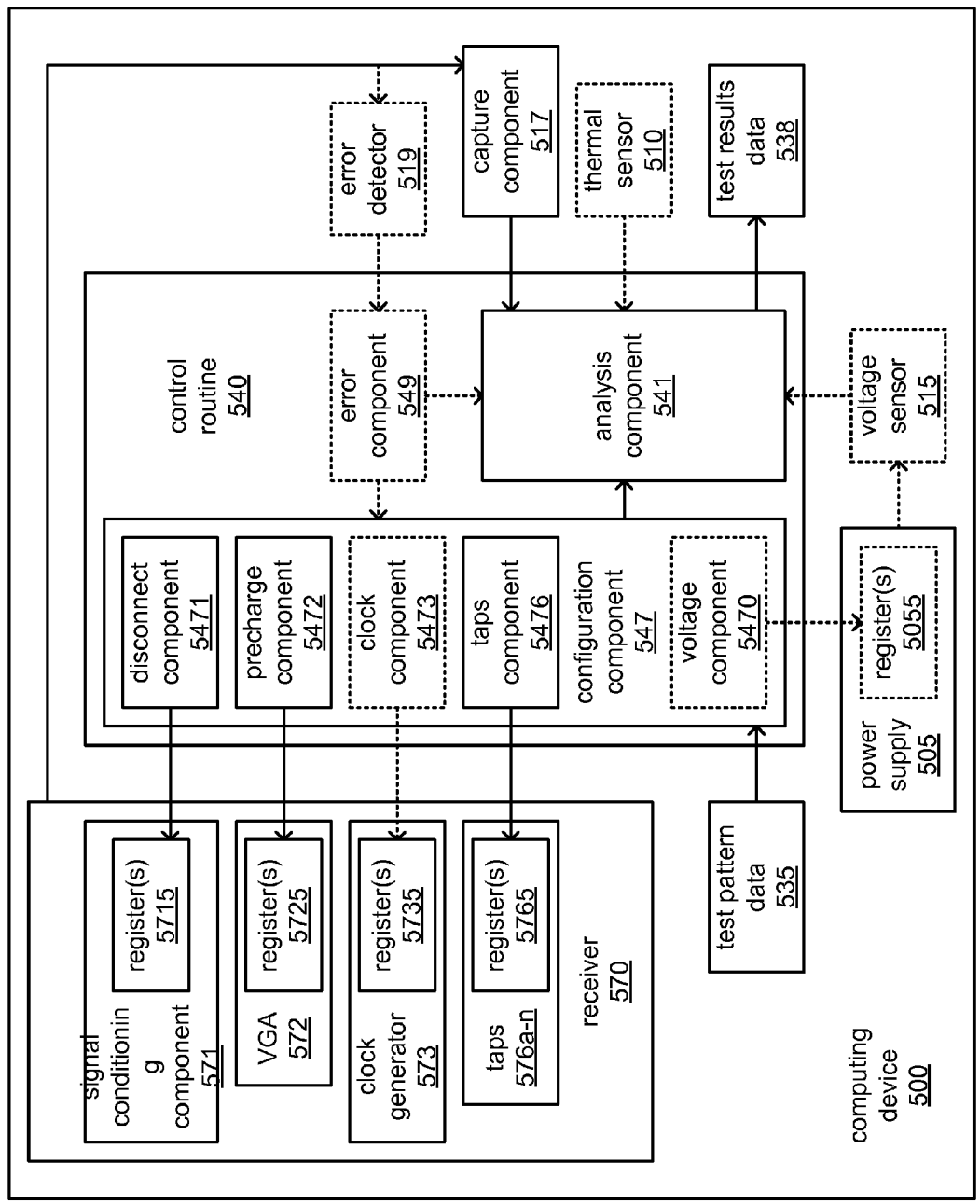
FIG. 6 illustrates a portion of an example embodiment of a computing device testing a receiver.

FIG. 6 illustrates a block diagram of a portion of an embodiment of the computing device 500 of the processing system 1000 in greater detail. More specifically, FIG. 6 depicts aspects of configuring an embodiment of the receiver 570 for testing and of operating at least an embodiment of the capture component 517 to capture the output of the receiver 570 during testing. As recognizable to those skilled in the art, the control routine 540, including the components of which it is composed, is selected to be operative on whatever type of processor or processors that are selected to implement applicable the processor component 550.

In various embodiments, the control routine 540 may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for the processor components 550. Where one or more device drivers are included, those device drivers may provide support for any of a variety of other components, whether hardware or software components, of the computing device 500.

The control routine 540 may include an error component 549 executable by the processor component 550 to trigger performance of testing of the depicted receiver 570 in response to an indication of a data error detected in data received through the receiver 570. In some embodiments, the indication of a data error may originate from an error detector 519 that may be coupled to the output of the receiver 570 to detect errors in the bit values output thereby. Where the signal received by the receiver 570 conveys a bitstream in which parity and/or another form of error detection or correction bits are included, the error detector 519 may employ parity checking and/or another form of error detection to detect errors. In other embodiments, the error component 549 may itself perform a CRC or other form of error check on whole blocks of data received through the receiver (e.g., a block of data earlier received through the receiver and stored to enable such error checking). Upon receiving an indication of a data error, regardless of the source of the indication, the error component may trigger performance of testing on the receiver 570 as part of diagnosing the source of the data error.

The control routine 540 may include a configuration component 547 executable by the processor component 550 to configure the receiver 570 to perform the test and/or to control parameters used in performing the test. More specifically, the configuration component 547 may include one or more of a disconnect component 5471, a precharge component 5472, a taps component 5476 and a voltage component 5470 to control various parameters of each test that is performed. Further, the configuration component 547 may include a clock component to control the performance of each test.

The disconnect component 5471 may program one or more registers 5715 of the signal conditioning component 571 to effectively disconnect the input of the receiver 570 from other components thereof to prevent signal activity at the input of the receiver 570 from influencing a test of the receiver 570. Again, depending on whether the signal conditioning component 571 implements a front end equalizer and/or what components make up that front end equalizer, the values programmed into the register(s) 5715 may specify any of a variety of parameters, including and not limited to, one or more coefficients defining one or more transforms to be implemented by digital filter(s) of the signal conditioning component 571.

The precharge component 5472 may program one or more registers 5725 of the VGA 572 either to directly output a differential bias voltage of a selected magnitude of voltage level, or to cooperate with the signal conditioning component 571 to generate a differential bias voltage of that selected voltage level. Again, where the VGA 572 is to cooperate with the signal conditioning component 571, the disconnect component 5471 may program the register(s) 5715 of the signal conditioning component 571 to provide the input of the VGA 572 with a steady differential voltage of a selected voltage level, and the precharge component 5472 may program the register(s) 5725 of the VGA 572 with a selected gain to amplify the differential voltage from the signal conditioning component 571 to generate the desired differential bias voltage. However, as also previously discussed, the VGA 572 may be implemented as part of a converged component (rather than as a physically distinct component) that may combine the VGA 572 as a gain stage with the signal conditioning component 571 and/or one or more other components that serve, during normal operation of the receiver 570, to enhance the quality of the signal received by the receiver 570. As a result, the disconnect component 5471 and the precharge component 5472 may program portions of a common register or register set of such a converged component (e.g., a single register or register set that includes both of the register(s) 5715 and 5725).

The taps component 5476 may program one or more registers 5765 of the taps 576a-x with a coefficient and/or other setting value(s) to cause the taps 576a-x to participate in providing multiple parallel feedback loops with differential voltage outputs of a selected magnitude of voltage level that enables the polarity of the differential voltage outputs of the taps 576a-x to overcome the polarity of the differential bias voltage output by the VGA 572. Again, this is to enable the polarity of the differential voltage at the input of the bit slicer 574 to be inverted with each sample taken by the bit slicer 574 of the differential voltage at its input.

In embodiments in which a voltage level of electric power provided by the power supply 505 for use by the receiver 570 is selectable, the voltage component 5470 (if present) may program one or more registers 5055 of the power supply 505 with a value that selects a particular voltage level of electric power so provided to the receiver 570. As recognizable to those skilled in the art, the power supply 505 may output electric power with a voltage level that is selectable in embodiments in which the processing system 1000 is a test system to characterize aspects of the receiver 570 and/or an IC into which the receiver is incorporated in tests in which the voltage level at which electric power is provided may be varied.

In some embodiments, testing of the receiver 570 may be started and/or ended through operation of the clock generator 573 to selectively generate or refrain from generating a clock signal. Further, the frequency of the clock signal generated by the clock generator 573 may be selectable. Thus, the clock component 5473 (if present) may program one or more registers 5735 of the clock generator 573 with a value selecting a frequency at which to generate a clock signal. Alternatively or additionally, the clock component 5473 may program one or more of the registers 5735 with a bit or other value to stop generation of a clock signal while one or more test parameters are configured and/or to start generation of a clock signal to cause testing to take place.

In programming one or more of the aforementioned registers within the receiver 570 and/or in otherwise configuring test parameters, one or more of the components 5470, 5471, 5472, 5473 and 5476 may retrieve indications of test parameters to be used from the test pattern data 535. In various embodiments, the test pattern data 535 may include indications of multiple sets of test parameters to test differing combinations of clock frequency, differential bias voltages and/or differential voltages output by the taps 576a-x, as has been discussed.

The control routine 540 may include an analysis component 541 to analyze results of testing the receiver 570. In some embodiments, the analysis component 541 may monitor the capture component 517 to receive a quantity of bit values captured by the capture component 517 from the output of the receiver 570 (e.g., the output of the bit slicer 574) during testing. In such embodiments, the analysis component may analyze those captured bits to determine whether they are made up of a series of alternating bit values that change at every bit between a high value and a low value that indicates that at least the bit slicer 574 was caused to self oscillate with each sample taken. In other embodiments, the analysis component may retrieve an indication from the capture component 517 of the capture component 517 having itself determined that the captured bits are made up of such a series of alternating bit values.

The analysis component 541 may additionally monitor the thermal sensor 510, the voltage sensor 515 and/or other components providing indications of conditions under which the receiver 570 is operated. As previously discussed, there may be a correlation between the ability of the receiver 570 to receive data at a desired data rate and either or both of a temperature of the IC into which the receiver 570 is incorporated and/or a voltage level at which electric power is provided to the receiver 570 (or other portion of the IC into which the receiver is incorporated). The analysis component 541 may test parameters and/or operating conditions under which the receiver 570 fails and/or passes testing to identify one or more correlations between operating conditions and the ability of the receiver to receive bits in a bitstream at a specific data rate.

The analysis component 541 may store indications of test parameters, test results, operating conditions and/or correlations found thereamong within the storage 560 as part of the test results data 538. In so storing indications of test parameters, the analysis component 541 may store indications of what differential bias voltage(s) were output by the VGA 572 and/or what differential voltages were output by the taps 576a-x. Alternatively or additionally, the analysis component 541 may store indications of coefficients and/or gain settings employed to specify those voltages, thereby making use of the correlations that exist between such voltage levels and the coefficients.

Figure 7:
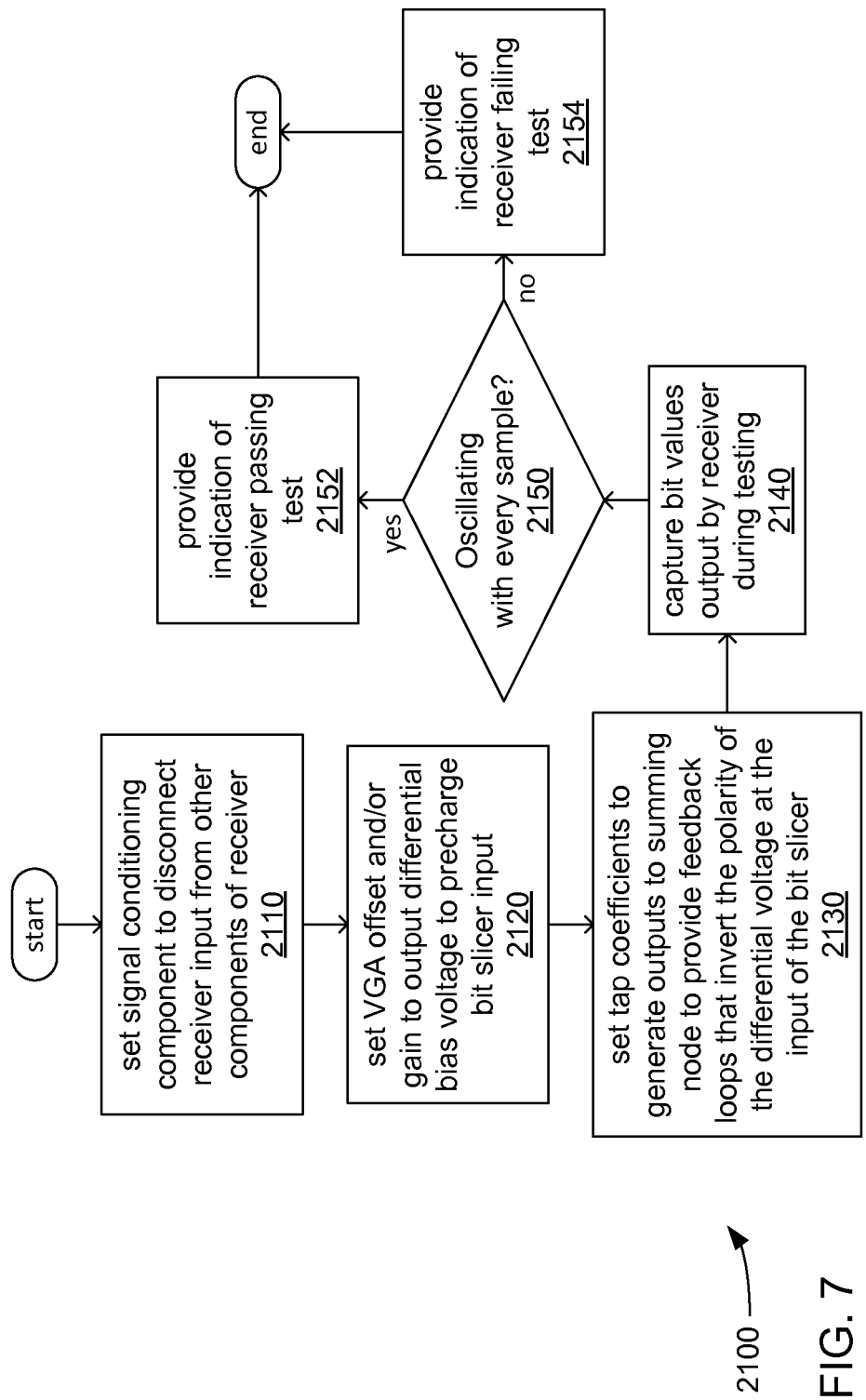
FIGS. 7-9 each illustrate a logic flow according to an embodiment.

FIG. 7 illustrates one embodiment of a logic flow 2100. The logic flow 2100 may be representative of some or all of the operations executed by one or more embodiments described herein. More specifically, the logic flow 2100 may illustrate operations performed by the processor component 550 in executing at least the control routine 540, and/or performed by other component(s) of the computing device 500.

At 2110, as part of preparing to perform a test of a receiver incorporated into an IC (e.g., the receiver 570 incorporated into one of the components 550, 560, 580 or 595) to receive a signal conveying a bitstream to that IC, a processor component of a computing device (e.g., the processor component 550 of the computing device 500) may configure a signal conditioning component of the receiver (e.g., the signal conditioning component 571) to disconnect the input of the receiver from other components of the receiver. As has been discussed, the signal conditioning component may be so configured by writing one or more values to one or more registers of the signal conditioning component, including without limitation, writing indications of one or more coefficients to those registers to cause digital filters of the signal conditioning component to implement one or more transforms to effectively disconnect the input of the signal conditioning component from its output to other components of the receiver.

At 2120, offset and/or gain settings of a VGA of the receiver (e.g., the VGA 572) may be set to output a differential bias voltage to precharge an input of a bit slicer of the receiver (e.g., the big slicer 574). The differential bias voltage may be selected to be above or below an offset voltage of that input of the bit slicer, and/or may be selected to have a differential voltage level that is less in magnitude than the magnitude of the differential voltage levels output by a set of taps of a DFE of the receiver (e.g., the taps 576a-x of the DFE 577).

At 2130, the set of taps are set with one or more coefficients that cause each of the taps to form part of one of multiple parallel feedback loops from the output of the bit slicer to the input of the bit slicer that cooperate to invert the polarity of the differential voltage at the input of the bit slicer with each sample that is taken by the bit slicer of the differential voltage at its input. Again, a chain of delay circuits (e.g., a chain made up of the delay circuits 575a-x) may couple the output of the bit slicer to the inputs of each tap of the set of taps, and the outputs of each of those taps may be coupled to the input of the bit slicer through a pair of conductors that define a summing node (e.g., the pair of conductors 578n and 578p that define the summing node 579.

At 2140, the bit values output by the receiver during testing are captured. Again, the output of the receiver may be the output of the bit slicer.

At 2150, the bits values output by the receiver during testing are analyzed to determine whether at least the bit slicer of the receiver is self oscillating with each sample that it takes. If there is such oscillation at 2150, then an indication of the receiver successfully passing the test is provided at 2152. Otherwise, an indication of a failure of the receiver is provided at 2154. As previously discussed, in some embodiments, an indication of one or the other these results may be stored as part of a test results data that may provide indications of characteristics of the receiver and/or that may be used to determine whether the IC into which the receiver is incorporated may be used in an application that entails use of the receiver to receive a bitstream with a high data transfer rate. Alternatively or additionally, the results of testing the receiver may be visually presented on a display of the computing device (e.g., the display 580) or transmitted via a network to another computing device (e.g., the remote computing device 100).

Figure 8:
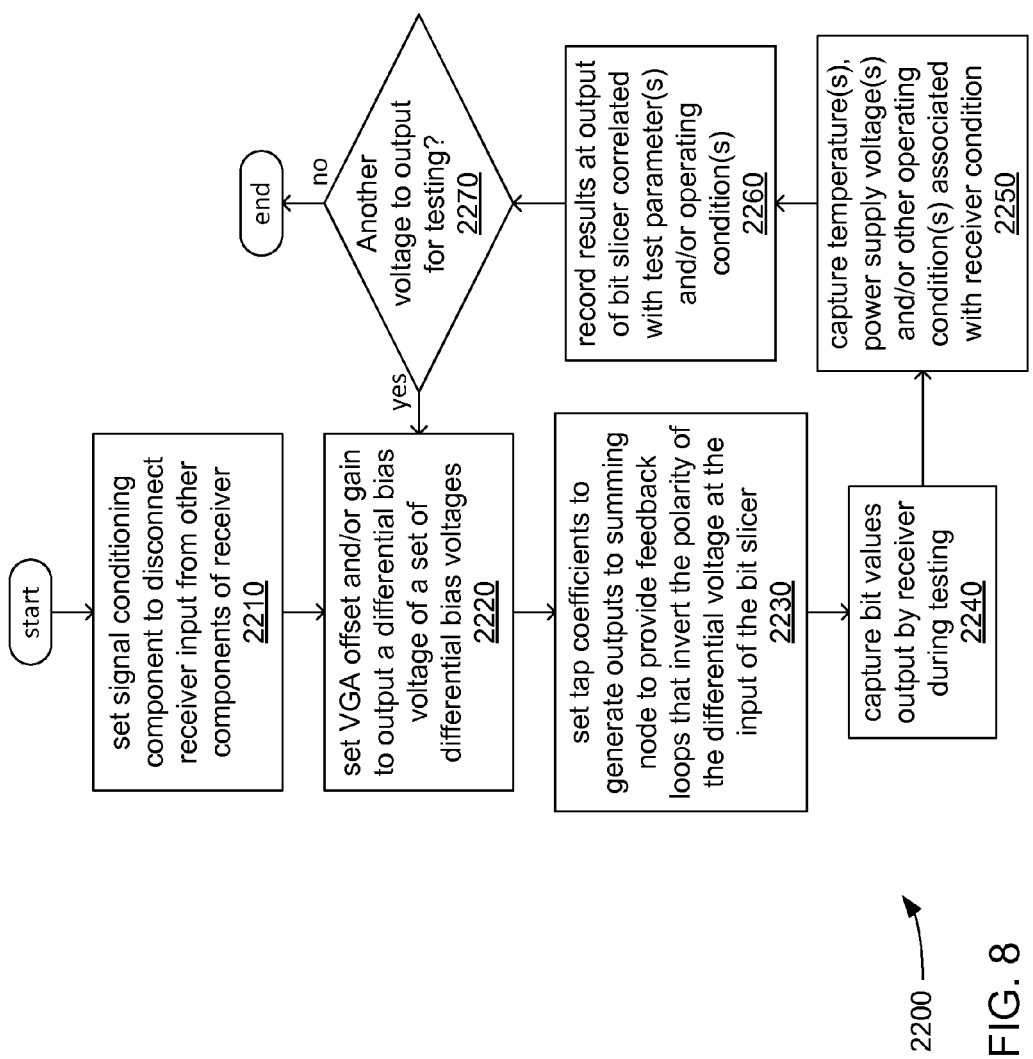

FIG. 8 illustrates one embodiment of a logic flow 2200. The logic flow 2200 may be representative of some or all of the operations executed by one or more embodiments described herein. More specifically, the logic flow 2200 may illustrate operations performed by the processor component 550 in executing at least the control routine 540, and/or performed by other component(s) of the computing device 500.

At 2210, as part of preparing to perform a test of a receiver incorporated into an IC (e.g., the receiver 570 incorporated into one of the components 550, 560, 580 or 595) to receive a signal conveying a bitstream to that IC, a processor component of a computing device (e.g., the processor component 550 of the computing device 500) may configure a signal conditioning component of the receiver (e.g., the signal conditioning component 571) to disconnect the input of the receiver from other components of the receiver. Again, in embodiments in which the signal conditioning component incorporates one or more digital filters, the signal conditioning component may be programmed with one or more coefficients to implement one or more transforms to effectively disconnect the input of the receiver from other components of the receiver.

At 2220, offset and/or gain settings of a VGA of the receiver (e.g., the VGA 572) may be set to output one differential bias voltages selected from a set of multiple differential bias voltages to precharge an input of a bit slicer of the receiver (e.g., the big slicer 574). The multiple differential bias voltages may be specified along with one or more other testing parameters in a test pattern data specifying different combinations of test parameters to use in multiple performances of testing.

At 2230, a set of taps of the receiver (e.g., the set of taps 576a-x) are set with one or more coefficients that cause each of the taps to form part of one of multiple parallel feedback loops from the output of the bit slicer to the input of the bit slicer that cooperate to recurringly invert the polarity of the differential voltage at the input of the bit slicer (e.g., inverting the differential voltage at the input of the bit slicer with each sample taken by the bit slicer of the differential voltage at its input). Again, a chain of delay circuits (e.g., a chain made up of the delay circuits 575a-x) may couple the output of the bit slicer to the inputs of each tap of the set of taps, and the outputs of each of those taps may be coupled to the input of the bit slicer through a pair of conductors that define a summing node (e.g., the pair of conductors 578n and 578p that define the summing node 579.

At 2240, the bit values output by the receiver during testing are captured. Again, the output of the receiver may be the output of the bit slicer. At 2250, temperature(s) associated with the receiver (or with the IC into which it is incorporated), voltage level(s) of electric power associated with the receiver (or with the IC into which is incorporated), and/or a measure of one or more other operating conditions associated with the receiver may also be captured. As previously discussed and as recognizable to those skilled in the art, performance of the receiver, including whether it is able to receive a bitstream at a particular data transfer rate without errors, may be affected by temperatures and/or the voltage level of electric power provided to the receiver.

At 2260, the bit values output by the bit slicer at the output of the receiver may be recorded in a manner correlated to one or more of the test parameters that may be varied during multiple performances of testing, and/or indications of one or more of the operating conditions associated with the receiver to generate a test results data. As previously discussed, such data may be analyzed to identify correlations of receiver performance with one or more test parameters and/or operating conditions. Alternatively or additionally, such data may be analyzed to determine whether failures of the receiver during testing were due to excessive latency in the feedback loops created by the taps and the chain of delay devices, or were due to insufficient sensitivity of input of the bit slicer, or a combination of both.

At 2270, a check is made as to whether there is another combination of test parameters (e.g., other differential bias voltage levels, other clock frequencies, etc.) to be used in another performance of testing. If so, then the setting of the VGA and/or setting of tap coefficients in accordance with another combination of test parameters is performed at 2220 and 2230.

Figure 9:
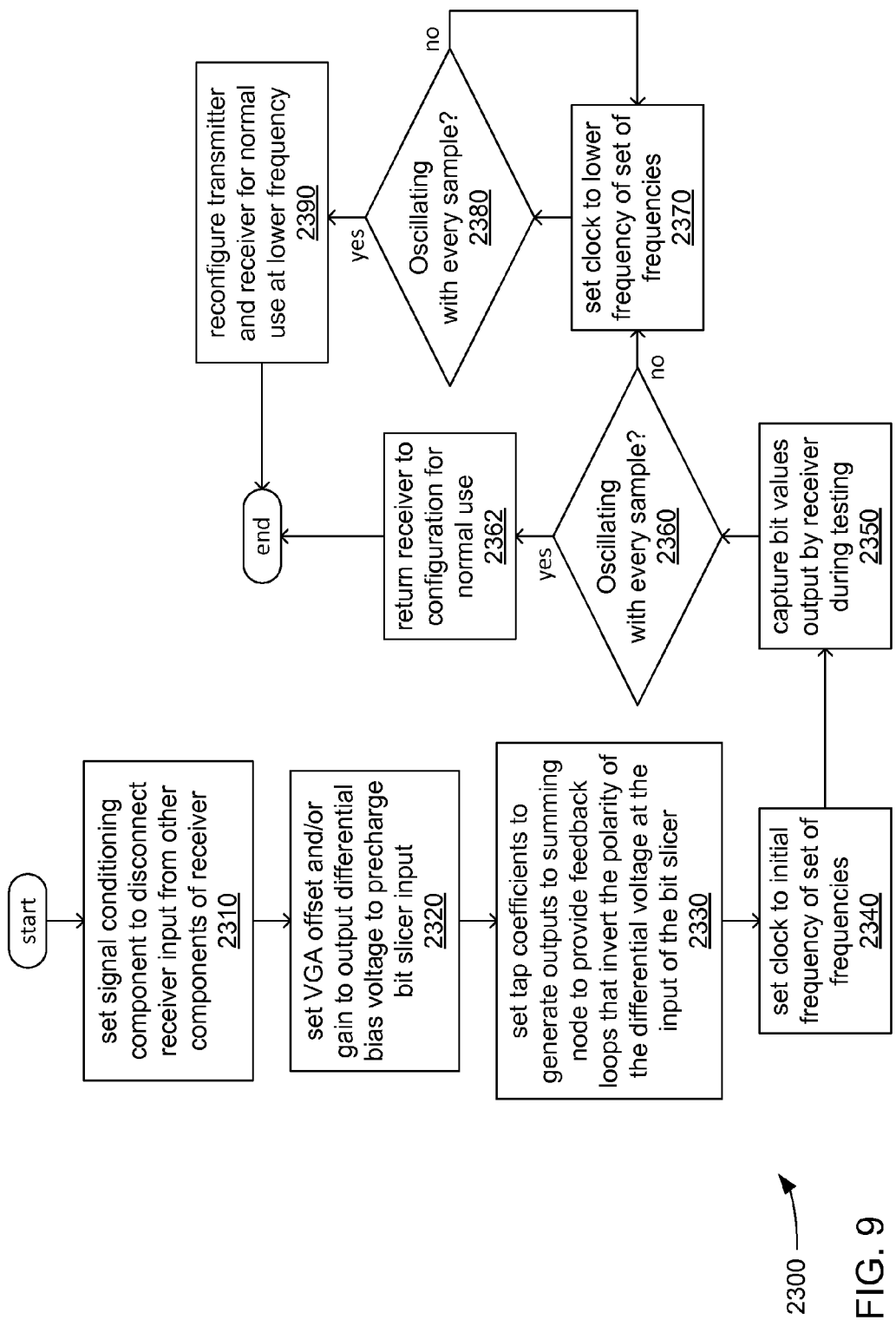

FIG. 9 illustrates one embodiment of a logic flow 2300. The logic flow 2300 may be representative of some or all of the operations executed by one or more embodiments described herein. More specifically, the logic flow 2300 may illustrate operations performed by the processor component 550 in executing at least the control routine 540, and/or performed by other component(s) of the computing device 500.

At 2310, as part of preparing to perform a test of a receiver incorporated into an IC (e.g., the receiver 570 incorporated into one of the components 550, 560, 580 or 595) to receive a signal conveying a bitstream to that IC, a processor component of a computing device (e.g., the processor component 550 of the computing device 500) may configure a signal conditioning component of the receiver (e.g., the signal conditioning component 571) to disconnect the input of the receiver from other components of the receiver. Again, in embodiments in which the signal conditioning component incorporates one or more digital filters, the signal conditioning component may be programmed with one or more coefficients to implement one or more transforms to effectively disconnect the input of the receiver from other components of the receiver.

At 2320, offset and/or gain settings of a VGA of the receiver (e.g., the VGA 572) may be set to output a differential bias voltage to precharge an input of a bit slicer of the receiver (e.g., the big slicer 574). The differential bias voltage may be selected to be above or below an offset voltage of that input of the bit slicer, and/or may be selected to have a differential voltage level that is less in magnitude than the magnitude of the differential voltage levels output by a set of taps of a DFE of the receiver (e.g., the taps 576a-x of the DFE, 577).

At 2330, the set of taps are set with one or more coefficients that cause each of the taps to form part of one of multiple parallel feedback loops from the output of the bit slicer to the input of the bit slicer that cooperate to cause recurring inversion of the differential voltage at the input of the bit slicer with every sample taken by the bit slicer of the differential voltage at its input. Again, a chain of delay circuits (e.g., a chain made up of the delay circuits 575a-x) may couple the output of the bit slicer to the inputs of each tap of the set of taps, and the outputs of each of those taps may be coupled to the input of the bit slicer through a pair of conductors that define a summing node (e.g., the pair of conductors 578n and 578p that define the summing node 579).

At 2340, a clock generator that drives the timing of the sampling performed by the bit slicer is set to do so at an initial frequency selected from a set of frequencies. The set of frequencies for the clock generator may be specified along with one or more other testing parameters in a test pattern data that may specify different combinations of test parameters to use in multiple performances of testing.

At 2350, the bit values output by the receiver during testing are captured. Again, the output of the receiver may be the output of the bit slicer.

At 2360, the bits values output by the receiver during testing are analyzed to determine whether at least the bit slicer of the receiver was self oscillating with each sample that it took during testing. If there was such oscillation at 2360, then the receiver may be deemed to have passed testing, and the components of the receiver (e.g., the signal conditioning component, the VGA and the set of taps) may be returned to their original configuration for normal use at 2362.

However, at 2360, if the bit slicer of the receiver was not oscillating with each sample it took during testing, then the clock generator may be set to a lower frequency of the set of frequencies at 2370 for another performance of testing. Then, at 2380, the bits values output by the receiver during testing are again analyzed to determine whether at least the bit slicer of the receiver was self oscillating with each sample that it took during testing at the lower frequency. If there was such oscillation at 2380, then the receiver may be deemed to have passed testing at the lower frequency, and the components of the receiver (e.g., the signal conditioning component, the VGA and the set of taps) may be returned to a configuration for normal use at 2390, but at the lower frequency. However, if the bit slicer of the receiver was not oscillating with each sample it took during testing at the lower frequency, then the clock generator may be set to a still lower frequency of the set of frequencies at 2370, and the test performed at again at the still lower frequency.

Figure 10:
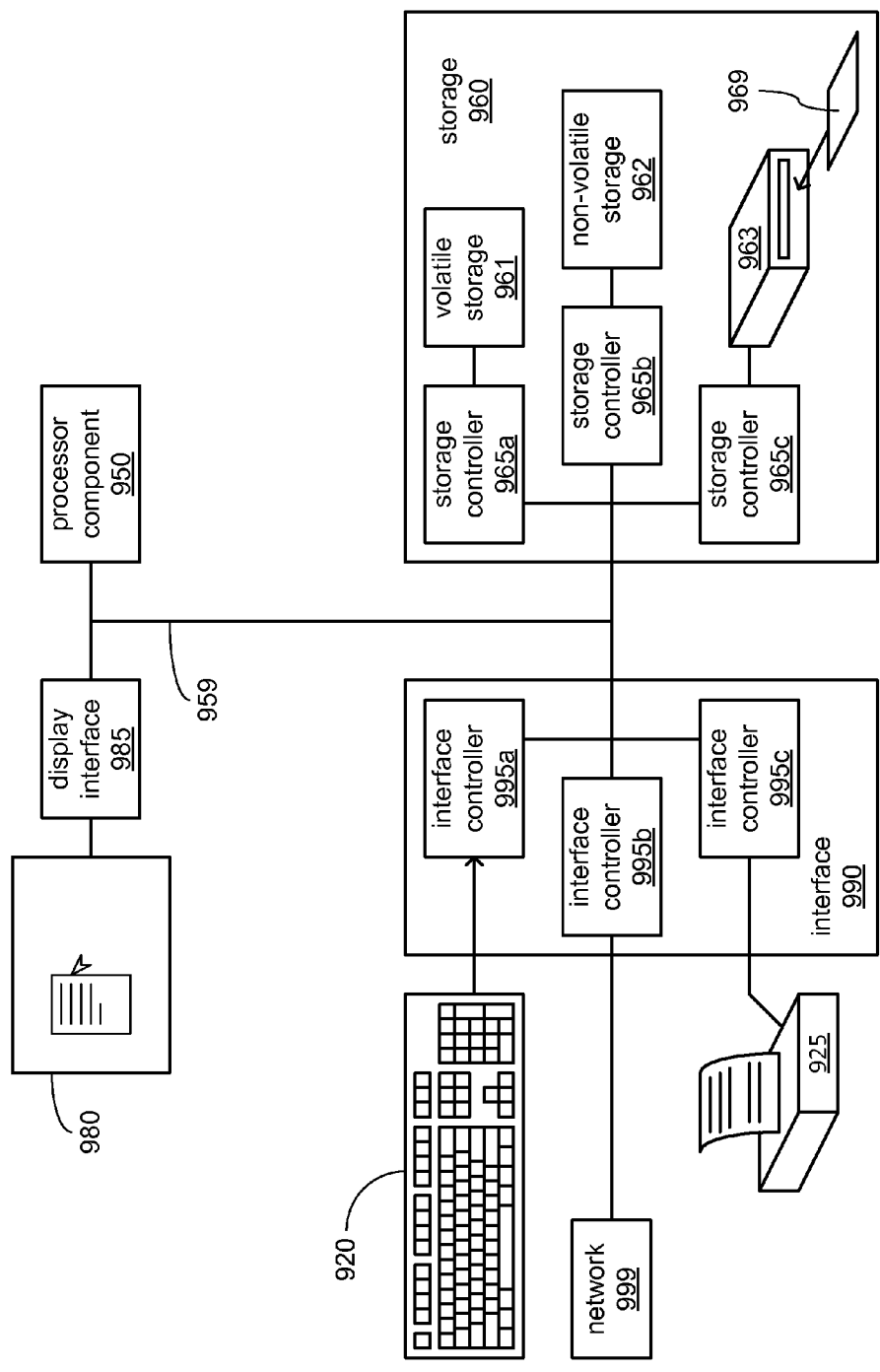
FIG. 10 illustrates a processing architecture according to an embodiment.

FIG. 10 illustrates an embodiment of an exemplary processing architecture 3000 suitable for implementing various embodiments as previously described. More specifically, the processing architecture 3000 (or variants thereof) may be implemented as part of one or more of the computing devices 100, 300, 500 or 700, and/or as part of the controller 600. It should be noted that components of the processing architecture 3000 are given reference numbers in which the last two digits correspond to the last two digits of reference numbers of at least some of the components earlier depicted and described as part of the computing devices 100, 300, 500 and 700, as well as the controller 600. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, a software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device includes at least a processor component 950, a storage 960, an interface 990 to other devices, and a coupling 959. As will be explained, depending on various aspects of a computing device implementing the processing architecture 3000, including its intended use and/or conditions of use, such a computing device may further include additional components, such as without limitation, a display interface 985.

The coupling 959 includes one or more buses, point-to-point interconnects, transceivers, buffers, crosspoint switches, and/or other conductors and/or logic that communicatively couples at least the processor component 950 to the storage 960. Coupling 959 may further couple the processor component 950 to one or more of the interface 990, the audio subsystem 970 and the display interface 985 (depending on which of these and/or other components are also present). With the processor component 950 being so coupled by couplings 959, the processor component 950 is able to perform the various ones of the tasks described at length, above, for whichever one(s) of the aforedescribed computing devices implement the processing architecture 3000. Coupling 959 may be implemented with any of a variety of technologies or combinations of technologies by which signals are optically and/or electrically conveyed. Further, at least portions of couplings 959 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to the processor components 550 and 650) may include any of a wide variety of commercially available processors, employing any of a wide variety of technologies and implemented with one or more cores physically combined in any of a number of ways.

As previously discussed, the storage 960 (corresponding to the storages 560 and 660) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 959 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data.

Thus, a routine including a sequence of instructions to be executed by the processor component 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (possibly corresponding to the interface 590) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, a microphone to monitor sounds of persons to accept commands and/or data signaled by those persons via voice or other sounds they may make, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

In Example 1, an apparatus to test an ability to receive a bitstream includes a precharge component to set a variable gain amplifier (VGA) of a receiver to output a differential bias voltage to an input of a bit slicer of the receiver through a summing node of the receiver to enable oscillation of the bit slicer to test the receiver, the receiver incorporated into an integrated circuit (IC) and an input of the receiver providing an input of the IC to receive data; a taps component to set a first tap of the receiver to form a first feedback loop that extends from an output of the bit slicer to the input of the bit slicer through a first delay circuit and the first tap, the first tap to output a first differential voltage to the summing node to invert a polarity of a sum of differential voltages at the input of the bit slicer to enable oscillation of the bit slicer, the summing node to generate the sum of differential voltages from at least the differential bias voltage and the first differential voltage; and a capture component coupled to an output of the receiver provided by the output of the bit slicer to capture a series of bit values consecutively output by the bit slicer.

In Example 2, which includes the subject matter of Example 1, the apparatus may include a disconnect component to set a signal conditioning component of the receiver to disconnect an input of the VGA from the input of the receiver.

In Example 3, which includes the subject matter of any of Examples 1-2, the disconnect component may set the signal conditioning component to output an input differential voltage to the input of the VGA, and the precharge component may set a gain of the VGA to amplify the input differential voltage to generate the differential bias voltage.

In Example 4, which includes the subject matter of any of Examples 1-3, the taps component may set a second tap of the receiver to form a second feedback loop partly in parallel with the first feedback loop, the second tap to output a second differential voltage to the summing node to invert the polarity of the sum of differential voltages at the input of the bit slicer to enable oscillation of the bit slicer, the second feedback loop extending from the output of the bit slicer to the input of the bit slicer through at least a portion of a chain of delay circuits and the second tap, the chain of delay circuits may include the first delay circuit and a second delay circuit, the first and second taps may be coupled to the first and second delay circuits to form a decision feedback equalizer (DFE), and the summing node may generate the sum of differential voltages from at least the differential bias voltage and the first and second differential voltages.

In Example 5, which includes the subject matter of any of Examples 1-4, the apparatus may include a clock component to set a frequency of a clock generator of the receiver to generate and drive the bit slicer with a clock signal at the clock frequency to enable oscillation of the bit slicer.

In Example 6, which includes the subject matter of any of Examples 1-5, the clock component may set the frequency of the clock generator to vary to determine a maximum frequency of a set of frequencies at which the bit slicer is able to oscillate.

In Example 7, which includes the subject matter of any of Examples 1-6, the precharge component may vary at least one of a magnitude and a polarity of the differential bias voltage to determine a sensitivity of the input of the bit slicer.

In Example 8, which includes the subject matter of any of Examples 1-7, the apparatus may include an analysis component to analyze the series of bit values captured by the capture component to determine whether the bit values of the series of bit values alternate between a high bit value and a low bit value between every pair of consecutive bit values during oscillation of the bit slicer, and to determine whether a propagation delay through at least the first feedback loop is low enough to allow the bit slicer to oscillate based at least on the determination of whether the bit values of the series of bit values alternate between every pair of consecutive bit values.

In Example 9, which includes the subject matter of any of Examples 1-8, the analysis component may monitor at least one of a thermal sensor or a voltage sensor, and may correlate at least one of a temperature detected by the thermal sensor or a voltage of electric power detected by the voltage sensor to the determination of whether the propagation delay through the first feedback loop is low enough.

In Example 10, which includes the subject matter of any of Examples 1-9, the apparatus may include an error component to trigger testing of the receiver based on an indication of a data error in data received through the receiver.

In Example 11, an apparatus to test an ability to receive a bitstream includes a receiver of an integrated circuit (IC) that includes a bit slicer to recurringly capture a sum of differential voltages at an input of the bit slicer and to output a series of bit values indicated by the sum of differential voltages at an output of the bit slicer; a variable gain amplifier (VGA) to output a differential bias voltage to the input of the bit slicer to enable oscillation of the bit slicer; a chain of delay circuits that includes a first delay circuit coupled to the output of the bit slicer; and a plurality of taps that cooperate with the chain of delay circuits to form a decision feedback equalizer (DFE), and that includes a first tap to form a first feedback loop that extends from the output of the bit slicer to the input of the bit slicer, the first tap to output a first differential voltage to invert a polarity of the sum of differential voltages based on a bit value at an output of the first delay circuit to enable oscillation of the bit slicer, and the sum of differential voltages including the differential bias voltage and the first differential voltage. The apparatus also includes a capture component coupled to the output of the receiver provided by the output of the bit slicer to capture the series of bit values, and an analysis component to analyze the series of bit values to determine whether a propagation delay of at least the first feedback loop is low enough to allow oscillation of the bit slicer based on whether the bit values of the series of bit values alternate between a high bit value and a low bit value between every pair of consecutive bit values.

In Example 12, which includes the subject matter of Example 11, the chain of delay circuits may include a second delay circuit coupled to the output of the first delay circuit, the plurality of taps may include a second tap to form a second feedback loop that extends from the output of the bit slicer to the input of the bit slicer partly in parallel with the first feedback loop, the second tap may output a second differential voltage to invert the polarity of the sum of differential voltages based on a bit value at an output of the second delay circuit to enable oscillation of the bit slicer, and the sum of differential voltages may include the second differential voltage.

In Example 13, which includes the subject matter of any of Examples 11-12, the apparatus may include a signal conditioning component to couple an input of the VGA to an input of the receiver to receive signal activity at the input of the receiver, and a disconnect component to set the signal conditioning component to disconnect the input of the VGA from the input of the receiver.

In Example 14, which includes the subject matter of any of Examples 11-13, the apparatus may include a clock generator to output a clock signal to the bit slicer to trigger capturing of the sum of differential signals, and a clock component to set a frequency of the clock signal generated by the clock generator to control the rate at which the bit slicer captures the sum of differential signals.

In Example 15, which includes the subject matter of any of Examples 11-14, the clock component may set the clock generator to vary the frequency of the clock signal to determine a maximum frequency of a set of frequencies at which at least the first feedback loop enables the bit slicer to oscillate In Example 16, which includes the subject matter of any of Examples 11-15, the apparatus may include a precharge component to vary at least one of a magnitude or a polarity of the differential bias voltage to determine a sensitivity of the input of the bit slicer.

In Example 17, which includes the subject matter of any of Examples 11-16, the analysis component may monitor at least one of a thermal sensor incorporated into the IC or a voltage sensor, and may correlate at least one of a temperature detected by the thermal sensor or a voltage of electric power detected by the voltage sensor to the determination of whether the propagation delay through the first feedback loop is low enough.

In Example 18, which includes the subject matter of any of Examples 11-17, the apparatus may include a power source, and a voltage component to set the power source to vary a voltage level of electric power provided by the power source to the receiver.

In Example 19, a computing-implemented method for testing an ability to receive a bitstream includes setting a variable gain amplifier (VGA) of a receiver to output a differential bias voltage to an input of a bit slicer of the receiver through a summing node of the receiver to enable oscillation of the bit slicer to test the receiver, with the receiver incorporated into an integrated circuit (IC) and an input of the receiver providing an input of the IC to receive data; setting a first tap of the receiver to output a first differential voltage to the summing node to invert a polarity of a sum of differential voltages at the input of the bit slicer to form a first feedback loop that extends from an output of the bit slicer to the input of the bit slicer through a first delay circuit and the first tap to enable oscillation of the bit slicer, where the summing node is to generate the sum of differential voltages from at least the differential bias voltage and the first differential voltage; capturing a series of bit values consecutively output by the bit slicer during testing of the receiver; and analyzing the series of bit values to determine whether the bit values alternate between a high bit value and a low bit value between every pair of consecutive bit values of the series of bit values to determine whether a propagation delay through at least the first feedback loop is low enough to allow the bit slicer to oscillate.

In Example 20, which includes the subject matter of Example 19, the method may include setting a signal conditioning component of the receiver to disconnect an input of the VGA from the input of the receiver.

In Example 21, which includes the subject matter of any of Examples 19-20, the method may include setting the signal conditioning component to output an input differential voltage to the input of the VGA and setting a gain of the VGA to amplify the input differential voltage to generate the differential bias voltage.

In Example 22, which includes the subject matter of any of Examples 19-21, the method may include setting a second tap of the receiver to output a second differential voltage to the summing node to invert a polarity of the sum of differential voltages to form a second feedback loop partly in parallel with the first feedback loop, with the second feedback loop extending from the output of the bit slicer to the input of the bit slicer through at least a portion of a chain of delay circuits and the second tap, where the chain of delay circuits may include the first delay circuit and a second delay circuit, where the first and second taps may be coupled to the first and second delay circuits to form a decision feedback equalizer (DFE), and where the summing node may generate the sum of differential voltages from at least the differential bias voltage and the first and second differential voltages.

In Example 23, which includes the subject matter of any of Examples 19-22, the method may include setting a frequency of a clock generator of the receiver to generate and drive the bit slicer with a clock signal at the clock frequency to enable oscillation of the bit slicer.

In Example 24, which includes the subject matter of any of Examples 19-23, the method may include setting the frequency of the clock generator to vary to determine a maximum frequency of a set of frequencies at which the bit slicer is able to oscillate.

In Example 25, which includes the subject matter of any of Examples 19-24, the method may include transmitting an indication of the maximum frequency to another device to cause the other device to transmit data to the input of the receiver at a data transfer rate associated with the maximum frequency, and setting the clock generator to the maximum frequency to cause the receiver to receive the data from the other device at the data transfer rate associated with the maximum frequency.

In Example 26, which includes the subject matter of any of Examples 19-25, the method may include transmitting an indication of the maximum frequency to a display for presentation.

In Example 27, which includes the subject matter of any of Examples 19-26, the method may include varying at least one of a magnitude and a polarity of the differential bias voltage to determine a sensitivity of the input of the bit slicer.

In Example 28, which includes the subject matter of any of Examples 19-27, the method may include monitoring at least one of a thermal sensor or a voltage sensor, and correlating at least one of a temperature detected by the thermal sensor or a voltage of electric power detected by the voltage sensor to the determination of whether the propagation delay through the first feedback loop is low enough.

In Example 29, which includes the subject matter of any of Examples 19-28, the method may include adjusting a frequency of the bit slicer based on a current temperature detected by the thermal sensor.

In Example 30, which includes the subject matter of any of Examples 19-29, the method may include commencing testing of the receiver based on an indication of error in data received through the receiver.

In Example 31, at least one machine-readable storage medium includes instructions that when executed by a computing device, cause the computing device to provide a differential bias voltage to an input of a bit slicer of the receiver through a summing node of the receiver to enable oscillation of the bit slicer to test the receiver, the receiver incorporated into an integrated circuit (IC) and an input of the receiver providing an input of the IC to receive data; set a first tap of the receiver to output a first differential voltage to the summing node to invert a polarity of a sum of differential voltages at the input of the bit slicer to form a first feedback loop that extends from an output of the bit slicer to the input of the bit slicer through a first delay circuit and the first tap to enable oscillation of the bit slicer, the summing node to generate the sum of differential voltages from at least the differential bias voltage and the first differential voltage; capture a series of bit values consecutively output by the bit slicer during testing of the receiver; and analyze the series of bit values to determine whether the bit values alternate between a high bit value and a low bit value between every pair of consecutive bit values of the series of bit values to determine whether a propagation delay through at least the first feedback loop is low enough to allow the bit slicer to oscillate.

In Example 32, which includes the subject matter of Example 31, the computing device may be caused to set a signal conditioning component of the receiver to disconnect an input of a variable gain amplifier (VGA) of the receiver from the input of the receiver, the VGA to provide the differential bias voltage to the input of the bit slicer.

In Example 33, which includes the subject matter of any of Examples 31-32, the computing device may be caused to set the signal conditioning component to output an input differential voltage to the input of the VGA, and set a gain of the VGA to amplify the input differential voltage to generate the differential bias voltage.

In Example 34, which includes the subject matter of any of Examples 31-33, the computing device may be caused to set a second tap of the receiver to output a second differential voltage to the summing node to invert a polarity of the sum of differential voltages to form a second feedback loop partly in parallel with the first feedback loop, with the second feedback loop extending from the output of the bit slicer to the input of the bit slicer through at least a portion of a chain of delay circuits and the second tap, where the chain of delay circuits may include the first delay circuit and a second delay circuit, the first and second taps coupled to the first and second delay circuits to form a decision feedback equalizer (DFE), and where the summing node may generate the sum of differential voltages from at least the differential bias voltage and the first and second differential voltages.

In Example 35, which includes the subject matter of any of Examples 31-34, the computing device may be caused to set a frequency of a clock generator of the receiver to generate and drive the bit slicer with a clock signal at the clock frequency to enable oscillation of the bit slicer.

In Example 36, which includes the subject matter of any of Examples 31-35, the computing device may be caused to set the frequency of the clock generator to vary to determine a maximum frequency of a set of frequencies at which the bit slicer is able to oscillate.

In Example 37, which includes the subject matter of any of Examples 31-36, the computing device may be caused to transmit an indication of the maximum frequency to another device to cause the other device to transmit data to the input of the receiver at a data transfer rate associated with the maximum frequency; and set the clock generator to the maximum frequency to cause the receiver to receive the data from the other device at the data transfer rate associated with the maximum frequency.

In Example 38, which includes the subject matter of any of Examples 31-37, the computing device may be caused to transmit an indication of the maximum frequency to a display for presentation.

In Example 39, which includes the subject matter of any of Examples 31-38, the computing device may be caused to vary at least one of a magnitude and a polarity of the differential bias voltage to determine a sensitivity of the input of the bit slicer.

In Example 40, which includes the subject matter of any of Examples 31-39, the computing device may be caused to monitor at least one of a thermal sensor or a voltage sensor; and correlate at least one of a temperature detected by the thermal sensor or a voltage of electric power detected by the voltage sensor to the determination of whether the propagation delay through the first feedback loop is low enough.

In Example 41, which includes the subject matter of any of Examples 31-40, the computing device may be caused to adjust a frequency of the bit slicer based on a current temperature detected by the thermal sensor.

In Example 42, which includes the subject matter of any of Examples 31-41, the computing device may be caused to commence testing of the receiver based on an indication of error in data received through the receiver.

In Example 43, at least one machine-readable storage medium may include instructions that when executed by a computing device, cause the computing device to perform any of the above.

In Example 44, an apparatus to test an ability to receive a bitstream may include means for performing any of the above.

The invention claimed is:

1. An apparatus to test an ability to receive a bitstream comprising:
   a precharge component to set a variable gain amplifier (VGA) of a receiver to output a differential bias voltage to an input of a bit slicer of the receiver through a summing node of the receiver to enable oscillation of the bit slicer to test the receiver, the receiver incorporated into an integrated circuit (IC) and an input of the receiver providing an input of the IC to receive data;
   a taps component to set a first tap of the receiver to form a first feedback loop that extends from an output of the bit slicer to the input of the bit slicer through a first delay circuit and the first tap, the first tap to output a first differential voltage to the summing node to invert a polarity of a sum of differential voltages at the input of the bit slicer to enable oscillation of the bit slicer, the summing node to generate the sum of differential voltages from at least the differential bias voltage and the first differential voltage; and
   a capture component coupled to an output of the receiver provided by the output of the bit slicer to capture a series of bit values consecutively output by the bit slicer.

2. The apparatus of claim 1, comprising a disconnect component to set a signal conditioning component of the receiver to disconnect an input of the VGA from the input of the receiver.

3. The apparatus of claim 1, the taps component to set a second tap of the receiver to form a second feedback loop partly in parallel with the first feedback loop, the second tap to output a second differential voltage to the summing node to invert the polarity of the sum of differential voltages at the input of the bit slicer to enable oscillation of the bit slicer, the second feedback loop extending from the output of the bit slicer to the input of the bit slicer through at least a portion of a chain of delay circuits and the second tap, the chain of delay circuits comprising the first delay circuit and a second delay circuit, the first and second taps coupled to the first and second delay circuits to form a decision feedback equalizer (DFE), and the summing node to generate the sum of differential voltages from at least the differential bias voltage and the first and second differential voltages.

4. The apparatus of claim 1, comprising a clock component to set a frequency of a clock generator of the receiver to generate and drive the bit slicer with a clock signal at the clock frequency to enable oscillation of the bit slicer.

5. The apparatus of claim 4, the clock component to set the frequency of the clock generator to drive the bit slicer with clock signals at a plurality of frequencies.

6. The apparatus of claim 1, comprising an analysis component to analyze the series of bit values captured by the capture component to determine whether the bit values of the series of bit values alternate between a high bit value and a low bit value between pairs of consecutive bit values during oscillation of the bit slicer.

7. An apparatus to test an ability to receive a bitstream comprising:
- a receiver of an integrated circuit (IC) comprising:
  - a bit slicer to recurringly capture a sum of differential voltages at an input of the bit slicer at a rate and to output a series of bit values indicated by the sum of differential voltages at an output of the bit slicer;
  - a variable gain amplifier (VGA) to output a differential bias voltage to the input of the bit slicer to enable oscillation of the bit slicer;
  - a chain of delay circuits comprising a first delay circuit coupled to the output of the bit slicer; and
  - a plurality of taps that cooperate with the chain of delay circuits to form a decision feedback equalizer (DFE), and comprising a first tap to form a first feedback loop that extends from the output of the bit slicer to the input of the bit slicer, the first tap to output a first differential voltage to invert a polarity of the sum of differential voltages based on a bit value at an output of the first delay circuit to enable oscillation of the bit slicer, and the sum of differential voltages comprising the differential bias voltage and the first differential voltage;
- a capture component coupled to the output of the receiver provided by the output of the bit slicer to capture the series of bit values; and
- an analysis component to analyze the series of bit values to determine whether a propagation delay of at least the first feedback loop is such to allow oscillation of the bit slicer at a rate based on whether the bit values of the series of bit values alternate between a high bit value and a low bit value between pairs of consecutive bit values.

8. The apparatus of claim 7, the chain of delay circuits comprising a second delay circuit coupled to the output of the first delay circuit, the plurality of taps comprising a second tap to form a second feedback loop that extends from the output of the bit slicer to the input of the bit slicer partly in parallel with the first feedback loop, the second tap to output a second differential voltage to invert the polarity of the sum of differential voltages based on a bit value at an output of the second delay circuit to enable oscillation of the bit slicer, and the sum of differential voltages comprising the second differential voltage.

9. The apparatus of claim 7, comprising:
- a clock generator to output a clock signal to the bit slicer to trigger capturing of the sum of differential voltages at the rate; and
- a clock component to set a frequency of the clock signal generated by the clock generator to control the rate at which the bit slicer captures the sum of differential voltages.

10. The apparatus of claim 9, the clock component to set the clock generator to vary the frequency of the clock signal to determine a maximum frequency at which at least the first feedback loop enables the bit slicer to oscillate.

11. The apparatus of claim 7, the analysis component to monitor at least one of a thermal sensor incorporated into the IC or a voltage sensor, and to correlate at least one of a temperature detected by the thermal sensor or a voltage of electric power detected by the voltage sensor to the determination of whether the propagation delay through the first feedback loop is such to allow oscillation of the bit slicer at the rate.

12. The apparatus of claim 7, comprising:
- a power source; and
- a voltage component to set the power source to vary a voltage level of electric power provided by the power source to the receiver.

13. A computer-implemented method for testing an ability to receive a bitstream comprising:
- setting a variable gain amplifier (VGA) of a receiver to output a differential bias voltage to an input of a bit slicer of the receiver through a summing node of the receiver to enable oscillation of the bit slicer to test the receiver, the receiver incorporated into an integrated circuit (IC) and an input of the receiver providing an input of the IC to receive data;
- setting a first tap of the receiver to output a first differential voltage to the summing node to invert a polarity of a sum of differential voltages at the input of the bit slicer to form a first feedback loop that extends from an output of the bit slicer to the input of the bit slicer through a first delay circuit and the first tap to enable oscillation of the bit slicer, the summing node to generate the sum of differential voltages from at least the differential bias voltage and the first differential voltage;
- capturing a series of bit values consecutively output by the bit slicer during testing of the receiver; and
- analyzing the series of bit values to determine whether the bit values alternate between a high bit value and a low bit value between pairs of consecutive bit values of the series of bit values to determine whether a propagation delay through at least the first feedback loop is such to allow the bit slicer to oscillate at a selected frequency.

14. The computer-implemented method of claim 13, the method comprising setting a clock generator of the receiver to generate and drive the bit slicer with a clock signal selected to enable oscillation of the bit slicer at the selected frequency.

15. The computer-implemented method of claim 14, the method comprising:
- setting the clock generator to generate and drive the bit slicer with clock signals at a plurality of frequencies; and repeating the capturing and analyzing of series of bit values with the bit slicer driven at each frequency of the plurality of frequencies to determine a maximum frequency at which the bit slicer is allowed to oscillate by at least the propagation delay through the first feedback loop.

16. The computer-implemented method of claim 15, the method comprising:
transmitting an indication of the maximum frequency to another device to cause the other device to transmit data to the input of the receiver at a data transfer rate associated with the maximum frequency; and
setting the clock generator to the maximum frequency to cause the receiver to receive the data from the other device at the data transfer rate associated with the maximum frequency.

17. The computer-implemented method of claim 13, the method comprising varying at least one of a magnitude and a polarity of the differential bias voltage to determine a sensitivity of the input of the bit slicer.

18. The computer-implemented method of claim 13, the method comprising:
monitoring at least one of a thermal sensor or a voltage sensor; and
correlating at least one of a temperature detected by the thermal sensor or a voltage of electric power detected by the voltage sensor to the determination of whether the propagation delay through the first feedback loop is such to allow the bit slicer to oscillate at the selected frequency.

19. The computer-implemented method of claim 18, the method comprising adjusting the selected frequency based on a current temperature detected by the thermal sensor.

20. At least one non-transitory machine-readable storage medium comprising instructions that when executed by a computing device, cause the computing device to:
provide a differential bias voltage to an input of a bit slicer of a receiver through a summing node of the receiver to enable oscillation of the bit slicer to test the receiver, the receiver incorporated into an integrated circuit (IC) and an input of the receiver providing an input of the IC to receive data;
set a first tap of the receiver to output a first differential voltage to the summing node to invert a polarity of a sum of differential voltages at the input of the bit slicer to form a first feedback loop that extends from an output of the bit slicer to the input of the bit slicer through a first delay circuit and the first tap to enable oscillation of the bit slicer, the summing node to generate the sum of differential voltages from at least the differential bias voltage and the first differential voltage;
capture a series of bit values consecutively output by the bit slicer during testing of the receiver; and
analyze the series of bit values to determine whether the bit values alternate between a high bit value and a low bit value between pairs of consecutive bit values of the series of bit values to determine whether a propagation delay through at least the first feedback loop is such to allow the bit slicer to oscillate at a selected frequency.

21. The at least one non-transitory machine-readable storage medium of claim 20, the computing device caused to set a signal conditioning component of the receiver to disconnect an input of a variable gain amplifier (VGA) of the receiver from the input of the receiver, the VGA to provide the differential bias voltage to the input of the bit slicer.

22. The at least one non-transitory machine-readable storage medium of claim 21, the computing device caused to:
set the signal conditioning component to output an input differential voltage to the input of the VGA; and
set a gain of the VGA to amplify the input differential voltage to generate the differential bias voltage.

23. The at least one non-transitory machine-readable storage medium of claim 20, the computing device caused to set a second tap of the receiver to output a second differential voltage to the summing node to invert a polarity of the sum of differential voltages to form a second feedback loop partly in parallel with the first feedback loop, the second feedback loop extending from the output of the bit slicer to the input of the bit slicer through at least a portion of a chain of delay circuits and the second tap, the chain of delay circuits comprising the first delay circuit and a second delay circuit, the first and second taps coupled to the first and second delay circuits to form a decision feedback equalizer (DFE), and the summing node to generate the sum of differential voltages from at least the differential bias voltage and the first and second differential voltages.

24. The at least one non-transitory machine-readable storage medium of claim 20, the computing device caused to vary at least one of a magnitude and a polarity of the differential bias voltage to determine a sensitivity of the input of the bit slicer.

25. The at least one non-transitory machine-readable storage medium of claim 20, the computing device caused to commence testing of the receiver based on an indication of error in data received through the receiver.

* * * * *